United States Patent
Huang et al.

(10) Patent No.: US 11,522,180 B2
(45) Date of Patent: Dec. 6, 2022

(54) METHODS FOR SYNTHESIZING VANADIUM OXIDE NANOBELTS AND APPLICATIONS AS CATHODE MATERIALS FOR BATTERIES

(71) Applicant: UNIVERSITY OF SOUTH CAROLINA, Columbia, SC (US)

(72) Inventors: Kevin Huang, Columbia, SC (US); Kaiyue Zhu, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 236 days.

(21) Appl. No.: 16/894,249

(22) Filed: Jun. 5, 2020

(65) Prior Publication Data
US 2021/0043929 A1 Feb. 11, 2021

Related U.S. Application Data

(60) Provisional application No. 62/883,804, filed on Aug. 7, 2019.

(51) Int. Cl.
| | |
|---|---|
| *H01M 4/02* | (2006.01) |
| *H01M 4/48* | (2010.01) |
| *C01G 31/00* | (2006.01) |
| *H01M 10/26* | (2006.01) |

(52) U.S. Cl.
CPC ............ *H01M 4/48* (2013.01); *C01G 31/006* (2013.01); *H01M 10/26* (2013.01); *C01P 2002/72* (2013.01); *C01P 2002/77* (2013.01); *C01P 2004/02* (2013.01); *C01P 2004/17* (2013.01); *C01P 2006/12* (2013.01); *C01P 2006/40* (2013.01); *H01M 2004/021* (2013.01); *H01M 2004/028* (2013.01); *H01M 2300/0002* (2013.01)

(58) Field of Classification Search
CPC ..................................................... H01M 4/02
See application file for complete search history.

(56) References Cited

U.S. PATENT DOCUMENTS

| | | | | |
|---|---|---|---|---|
| 2008/0138707 | A1* | 6/2008 | Takeuchi | H01M 4/54 423/604 |
| 2016/0006028 | A1* | 1/2016 | Nair | H01M 4/0471 252/182.1 |

OTHER PUBLICATIONS

Murashova ("Preparation of crystal structure of sodium calcium orthovanadate pyrovanadate, Na3Ca2(VO4)(V2O7)" Zhurnal Neorganicheskoi Khimii (1988).*

(Continued)

*Primary Examiner* — Jacob B Marks
(74) *Attorney, Agent, or Firm* — Dority & Manning, P.A.

(57) ABSTRACT

In general, the present disclosure is directed to methods for synthesizing vanadium oxide nanobelts, as well as the corresponding chemical composition of the vanadium oxide nanobelts. Also described are materials which can incorporate the vanadium oxide nanobelts, such as including the vanadium oxide nanobelts as a cathode material for use in energy storage applications (e.g., batteries). The vanadium oxide nanobelts described herein display structural characteristics that may provide improved diffusion and/or charge transfer between ions. Thus, batteries incorporating implementations of the current disclosure may demonstrate improved properties such as higher capacity retention over charge discharge cycling.

19 Claims, 12 Drawing Sheets

(56) References Cited

OTHER PUBLICATIONS

Adams, et al. "High Power Lithium Ion Battery Materials by Computational Design" *Phys. Stat. Solidi A* 208 (2011) pp. 1746-1753.

Alfaruqi, et al. "Electrochemical Zinc Intercalation in Lithium Vanadium Oxide: A High-Capacity Zinc-Ion Battery Cathode" *Chem. Mater.* 29 (2017) pp. 1684-1694.

Anisimov, et al. "First-Principles Calculations of the Electronic Structure and Spectra of Strongly Correlated Systems: The LDA+U Method" *J. Phys. Condens. Matt.* 9 (1997) pp. 767-808.

Augustyn, et al. "Pseudocapacitive Oxide Materials for High-Rate Electrochemical Energy Storage" *Ener. Environ. Sci.* 7 (2014) pp. 1597-1641.

Augustyn, et al. "High-Rate Electrochemical Energy Storage Through $Li^+$ Intercalation Pseudocapacitance" *Nat. Mater.* 12 (2013) pp. 518-522.

Blöchl, P.E. "Projector Augmented-Wave Method" *Phys. Rev. B* 50 (1994) pp. 17953-17979.

Cao, et al. "Quantitative Investigation on the Effect of Hydrogenation on the Performance of $MnO_2/H$-$TiO_2$ Composite Electrodes for Supercapacitors" *J. Mater. Chem. A* 3 (2015) pp. 3785-3793.

Chae, et al. "Electrochemical Zinc-Ion Intercalation Properties and Crystal Structures of $ZnMo_6S_8$ and $Zn_2Mo_6S_8$ Chevrel Phases in Aqueous Electrolytes" *Inorg. Chem.* 55 (2016) pp. 3294-3301.

Charles, et al. "Structural Water Engaged Disordered Vanadium Oxide Nanosheets for High Capacity Aqueous Potassium-Ion Storage" *Nat. Comm.* 8:15520 (2017) pp. 1-8.

Chu, et al. "Opportunities and Challenges for a Sustainable Energy Future" *Nature* 488 (2012) pp. 294-303.

Conway, et al. "The Role and Utilization of Pseudocapacitance for Energy Storage by Supercapacitors" *J. Power Sources* 66 (1997) pp. 1-14.

Dunn, et al. "Electrical Energy Storage for the Grid: A Battery of Choices" *Science* 334 (2011) pp. 928-935.

Fang, et al. "Recent Advances in Aqueous Zinc-Ion Batteries" *ACS Ener. Lett.* 3 (2018) pp. 2480-2501.

Grimme, et al. "Effect of the damping function in dispersion corrected density functional theory" *J. Comput. Chem.* 32 (2011) pp. 1456-1465.

Guduru, et al. "A Brief Review on Multivalent Intercalation Batteries with Aqueous Electrolytes" *Nanomaterials* 6 (2016) pp. 1-19.

Guo, et al. "Mechanistic Insights of $Zn^{2+}$ Storage in Sodium Vanadates" *Adv. Ener. Mater.* 8:1801819 (2018) pp. 1-7.

He, et al. "Layered $VS_2$ Nanosheet-Based Aqueous Zn Ion Battery Cathode" *Adv. Ener. Mater.* 7:1601920 (2017) pp. 1-5.

He, et al. "High-Performance Aqueous Zinc-Ion Battery Based on Layered $H_2V_3O_8$ Nanowire Cathode" *Small* 13:1702551 (2017) pp. 1-7.

Hohenberg, et al. "Inhomogeneous Electron Gas" *Phys. Rev.* 136 (1964) pp. B864-B871.

Hu, et al. "Highly Durable $Na_2V_6O_{16}$ •$1.63H_2O$ Nanowire Cathode for Aqueous Zinc-Ion Battery" *Nano Lett.* 18 (2018) pp. 1758-1763.

Hu, et al. "$Zn/V_2O_5$ Aqueous Hybrid-Ion Battery with High Voltage Platform and Long Cycle Life" *ACS Appl. Mater. Interf.* 9 (2017) pp. 42717-42722.

Hu, et al. "Design and Tailoring of the Nanotubular Arrayed Architecture of Hydrous $RuO_2$ for Next Generation Supercapacitors" *Nano Lett.* 6 (2006) pp. 2690-2695.

Huang, et al. "Recent Progress of Rechargeable Batteries Using Mild Aqueous Electrolytes" *Small Meth.* 3:1800272 (2019) pp. 1-20.

Kim, et al. "Aqueous Rechargeable Li and Na Ion Batteries" *Chem. Rev.* 114 (2014) pp. 11788-11827.

Kohn, et al. "Self-Consistent Equations Including Exchange and Correlation Effects" *Phys. Rev.* 140 (1965) pp. A1133-A1138.

Konarov, et al. "Present and Future Perspective on Electrode Materials for Rechargeable Zinc-Ion Batteries" *ACS Ener. Lett.* 3 (2018) pp. 2620-2640.

Kresse, et al. "Efficiency of Ab-Initio Total Energy Calculations for Metals and Semiconductors Using a Plane-Wave Basis Set" *Comput. Mater. Sci.* 6 (1996) pp. 15-50.

Kundu, et al. "Aqueous vs. Nonaqueous Zn-Ion Batteries: Consequences of the Desolvation Penalty at the Interface" *Ener. Environ. Sci.* 11 (2018) pp. 881-892.

Kundu, et al. "A High-Capacity and Long-Life Aqueous Rechargeable Zinc Battery Using a Metal Oxide Intercalation Cathode" *Nat. Ener.* 1:16119 (2016) pp. 1-8.

Larcher, et al. "Towards Greener and More Sustainable Batteries for Electrical Energy Storage" *Nat. Chem.* 7 (2015) pp. 19-29.

Li, et al. "Mechanistic Insight into the Electrochemical Performance of $Zn/VO_2$ Batteries with an Aqueous $ZnSO_4$ Electrolyte" *Adv. Ener. Mater.* 9:1900237 (2019) pp. 1-10.

Liu, et al. "Behavior of Molybdenum Nitrides as Materials for Electrochemical Capacitors-Comparison with Ruthenium Oxide" *J. Electrochem. Soc.* 145 (1998) pp. 1882-1888.

Ming, et al. "Zinc-Ion Batteries: Materials, Mechanisms, and Applications" *Mater. Sci. Eng. R* 135 (2019) pp. 58-84.

Ming, et al. "Layered $MgxV_2O_5$•$nH_2O$ as Cathode Material for High Performance Aqueous Zinc Ion Batteries" *ACS Ener. Lett.* 3 (2018) pp. 2602-2609.

Mizuno, et al. "Suppressed Activation Energy for Interfacial Charge Transfer of a Prussian Blue Analog Thin Film Electrode with Hydrated Ions ($Li^+$, $Na^+$, and $Mg^{2+}$)" *J. Phys. Chem. C* 117 (2013) pp. 10877-10882.

Pan, et al. "Reversible Aqueous Zinc/Manganese Oxide Energy Storage from Conversion Reactions" *Nat. Ener.* 1:16039 (2016) pp. 1-7.

Pang, et al. "$H_2V_3O_8$ Nanowire/Graphene Electrodes for Aqueous Rechargeable Zinc Ion Batteries with High Rate Capability and Large Capacity" *Adv. Ener. Mater.* 8:1800144 (2018) pp. 1-9.

Parua, et al. "Evaluation of Multivalent Cation Insertion in Single- and Double-Layered Polymorphs of $V_2O_5$" *ACS Appl. Mater. Interf.* 9 (2017) pp. 23756-23765.

Perdew, et al. "Generalized Gradient Approximation Made Simple" *Phys. Rev. Lett.* 77 (1996) pp. 3865-3868.

Posada, et al. "Aqueous Batteries as Grid Scale Energy Storage Solutions" *Renew. Sustain. Ener. Rev.* 68 (2017) pp. 1174-1182.

Sambandam, et al. "$K_2V_6O_{16}$•$2.7H_2O$ Nanorod Cathode: An Advanced Intercalation System for High Energy Aqueous Rechargeable Zn-Ion Batteries" *J. Mater. Chem. A* 6 (2018) pp. 15530-15539.

Smidstrup, et al. "Improved initial guess for minimum energy path calculations" *J. Chem. Phys.* 140:214106 (2014) pp. 9901-9904.

Song, et al. "Recent Advances in Zn-Ion Batteries" *Adv. Funct. Mater.* 28:1802564 (2018) pp. 1-27.

Soundharrajan, et al. "$Na_2V_6O_{16}$108 $3H_2O$ Barnesite Nanorod: An Open-Door to Display a Stable and High-Energy for Aqueous Rechargeable Zn-Ion Batteries as Cathode" *Nano Lett.* 18 (2018) pp. 2402-2410.

Sun, et al. "$Zn/MnO_2$ Battery Chemistry with $H^+$ and $Zn^{2+}$ Coinsertion" *J. Am. Chem. Soc.* 139 (2017) pp. 9775-9778.

Tarascon, et al. "Issues and Challenges Facing Rechargeable Lithium Batteries" *Nature* 414 (2001) pp. 359-367.

Trócoli, et al. "An Aqueous Zinc-Ion Battery Based on Copper Hexacyanoferrate" *ChemSusChem* 8 (2015) pp. 481-485.

Wan, et al. "Aqueous Rechargeable Zinc/Sodium Vanadate Batteries with Enhanced Performance from Simultaneous Insertion of Dual Carriers" *Nat. Comm.* 9:1656 (2018) pp. 1-11.

Wang, et al. "Highly Reversible Zinc Metal Anode for Aqueous Batteries" *Nat. Mater.* 17 (2018) pp. 543-549.

Wang, et al. "Pseudocapacitive Contributions to Electrochemical Energy Storage in $TiO_2$ (Anatase) Nanoparticles" *J. Phys. Chem. C* 111 (2007) pp. 14925-14931.

Wu, et al. "Unraveling the Role of Structural Water in Bilayer $V_2O_5$ during $Zn^{2+}$-Intercalation: Insights from DFT Calculations" *J. Mater. Chem. A* 7 (2019) pp. 5612-5620.

Wu, et al. "XPS and UPS Study of Na Deposition on Thin Film $V_2O_5$" *Appl. Surf. Sci.* 252 (2005) pp. 1801-1805.

Xia, et al. "Rechargeable Aqueous Zinc-Ion Battery Based on Porous Framework Zinc Pyrovanadate Intercalation Cathode" *Adv. Mater.* 30:1705580 (2018) pp. 1-7.

(56) References Cited

OTHER PUBLICATIONS

Xia, et al. "Highly Stable Aqueous Zinc-Ion Storage Using a Layered Calcium Vanadium Oxide Bronze Cathode" *Angew. Chem.* 57 (2018) pp. 3943-3948.
Xiang, et al. "A Reduced Graphene Oxide/$Co_3O_4$ Composite for Supercapacitor Electrode" *J. Power Sources* 226 (2013) pp. 65-70.
Xu, et al. "Energetic Zinc Ion Chemistry: The Rechargeable Zinc Ion Battery" *Angew. Chem.* 51 (2012) pp. 933-935.
Yan, et al. "Water-Lubricated Intercalation in $V_2O_5 \cdot nH_2O$ for High-Capacity and High-Rate Aqueous Rechargeable Zinc Batteries" *Adv. Mater.* 30:1703725 (2018) pp. 1-6.
Yang, et al. "$Li^+$ Intercalated $V_2O_5 \cdot nH_2O$ with Enlarged Layer Spacing and Fast Ion Diffusion as an Aqueous Zinc-Ion Battery Cathode" *Ener. Environ. Sci.* 11 (2018) pp. 3157-3162.
Yang, et al. "Electrochemical Energy Storage for Green Grid" *Chem. Rev.* 111 (2011) pp. 3577-3613.
Zhang, et al. "Hydrated layered vanadium oxide as a highly reversible cathode for rechargeable aqueous zinc batteries" *Adv. Funct. Mater.* 29:1807331 (2019) pp. 1-9.
Zhang, et al. "Rechargeable Aqueous Zinc-Manganese Dioxide Batteries with High Energy and Power Densities" *Nat. Comm.* 8:405 (2017) pp. 1-9.
Zhang, et al. "Cation-Deficient Spinel $ZnMn_2O_4$ Cathode in $Zn(CF_3SO_3)_2$ Electrolyte for Rechargeable Aqueous Zn-Ion Battery" *J. Am. Chem. Soc.* 138 (2016) pp. 12894-12901.
Zhang, et al. "Towards High-Voltage Aqueous Metal-Ion Batteries Beyond 1.5 V: The Zinc/Zinc Hexacyanoferrate System" *Adv. Ener. Mater.* 5:1400930 (2015) pp. 1-5.
Zhao, et al. "Long-Life and Deeply Rechargeable Aqueous Zn Anodes Enabled by a Multifunctional Brightener-Inspired Interphase" *Ener. Environ. Sci.* 12 (2019) pp. 1938-1949.

\* cited by examiner

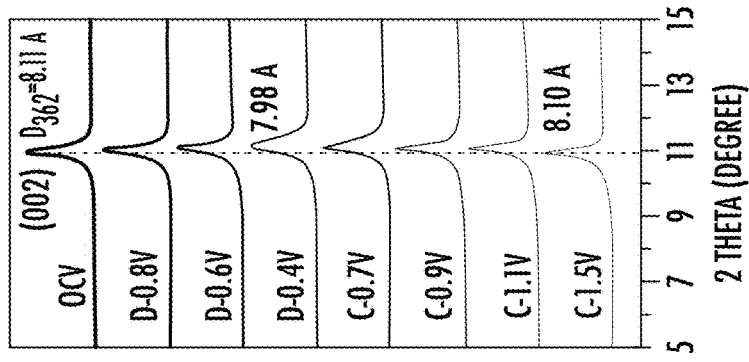
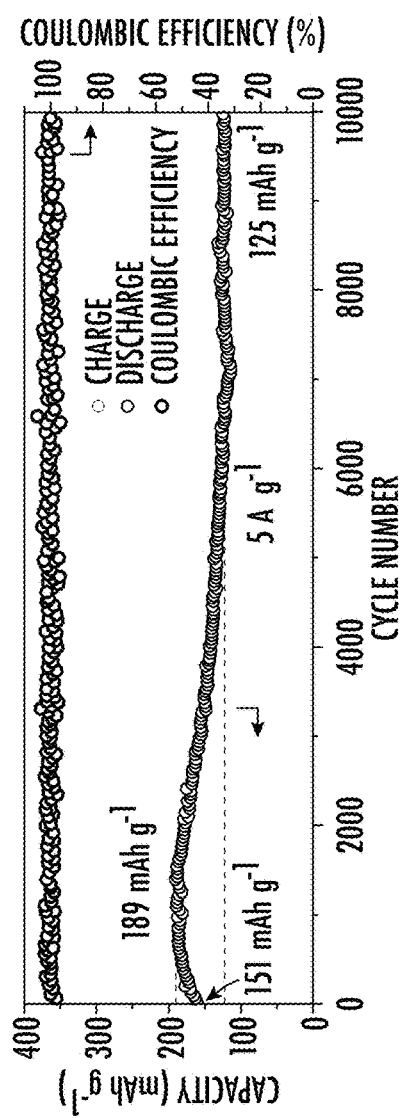
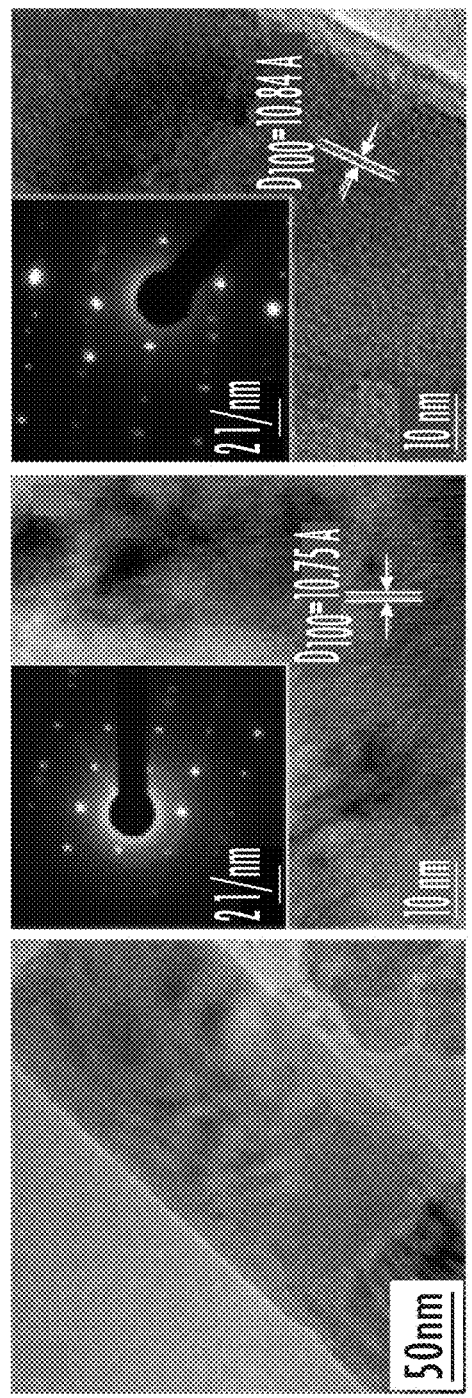
FIG. 8A  FIG. 8B  FIG. 8C  FIG. 8D  FIG. 8E

METHODS FOR SYNTHESIZING VANADIUM OXIDE NANOBELTS AND APPLICATIONS AS CATHODE MATERIALS FOR BATTERIES

CROSS REFERENCE TO RELATED APPLICATION

This application claims filing benefit of U.S. Provisional Patent Application Ser. No. 62/883,804, having a filing date of Aug. 7, 2019, which is being incorporated herein by reference for all purposes.

FEDERAL RESEARCH STATEMENT

This invention was made with Government support under Grant No. DE-AR0000492, awarded by Energy Advance Research Projects Agency Energy (ARPA-E) and U.S. Department of Energy, and Grant Nos. CBET-1801284 and DMR-1464112, awarded by the National Science Foundation (NSF). The Government has certain rights in the invention.

BACKGROUND

Growing demand for energy and awareness to protect our environment have sparked rapid development of clean, renewable energy technology in recent decades as an effort to reduce the use of conventional fossil fuels. However, the production of renewable power can be hampered by unpredictable and/or intermittent availability, thus promoting widespread adoption requires developing an effective "buffering" (e.g., energy storage) technology to smooth out possible fluctuations. Rechargeable batteries have long been deemed one of the most promising "buffering" solutions. The significant advances in lithium ion battery (LIB) technology in the past decades has revolutionized portable consumer electronics. However, a further penetration of LIB into the large-scale, stationary energy storage (SES) market is hindered by the concerns over operational safety and cost, primarily due to the use flammable organic electrolytes and expensive electrode materials. New battery technologies suited for SES applications are, therefore, needed.

SUMMARY

Generally, the present disclosure is directed to methods for synthesizing vanadium oxide nanobelts, as well as the corresponding chemical composition of the vanadium oxide nanobelts. Also described are materials which incorporate the vanadium oxide nanobelts, such as batteries including the vanadium oxide nanobelts as a cathode material. The vanadium oxide nanobelts described herein display structural characteristics that may provide improved diffusion and/or charge transfer between ions. Thus, batteries incorporating implementations of the current disclosure may demonstrate improved properties such as higher capacity retention over charge discharge cycling.

BRIEF DESCRIPTION OF THE FIGURES

A full and enabling disclosure of the present invention, including the best mode thereof to one skilled in the art, is set forth more particularly in the remainder of the specification, which includes reference to the accompanying figures, in which:

FIG. 8A illustrates a graph displaying example data for an example embodiment according to the disclosure FIGS. 8B-8D illustrate microscopy images of example embodiments according to the disclosure.

FIG. 8E illustrate a graph displaying example data for an example embodiment according to the disclosure.

Figure 1A:
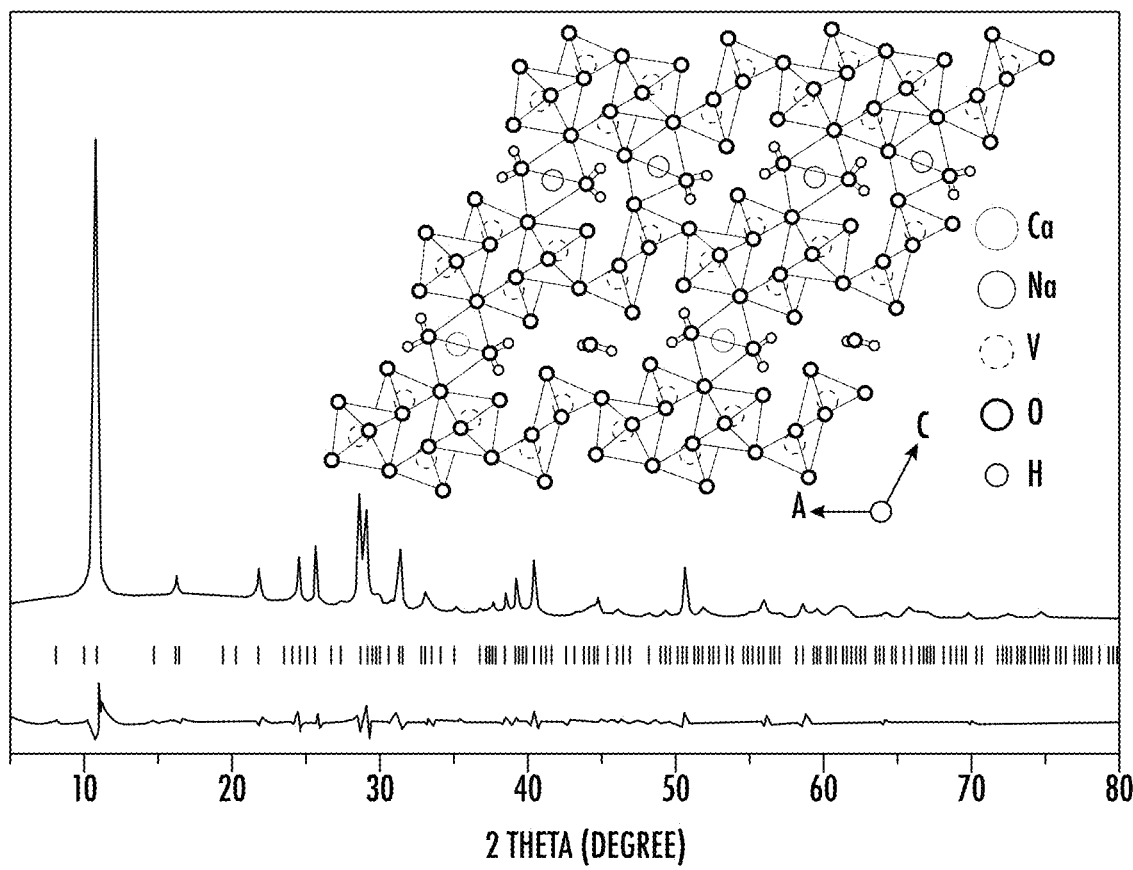
FIG. 1A illustrates example characterization data for an example embodiment according to the disclosure.

Repeat use of reference characters in the present specification and drawings is intended to represent the same or analogous features or elements of the present invention.

DETAILED DESCRIPTION

Reference now will be made to embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only and is not intended as limiting the broader aspects of the present invention, which broader aspects are embodied exemplary constructions.

The present disclosure is directed to methods for synthesizing vanadium oxide nanobelts, as well as the corresponding chemical composition of the vanadium oxide nanobelts. Also described herein are materials which can incorporate the vanadium oxide nanobelts, such as including the vanadium oxide nanobelts as a cathode material for use in energy storage applications (e.g., batteries). In general, the vanadium oxide nanobelts display structural characteristics that may provide improved diffusion and/or charge transfer between ions. Thus, batteries incorporating implementations of the current disclosure may demonstrate improved properties such as higher capacity retention over charge discharge cycling.

In an example implementation, a method of forming a vanadium oxide nanobelt can include combining a vanadium compound, an alkali metal salt, and an alkaline earth metal salt in a sealable vessel (e.g., an autoclave). The vessel containing the vanadium compounds and salts can then be sealed and the sealed vessel heated over a time period. Aspects of the reaction components which include the vanadium compound, the alkali metal salt, and the alkaline earth metal salt can include counter ions, such as anion or cation, and may further include the oxidation state of vanadium in the vanadium compound.

One example aspect of the vanadium compound can include the oxidation state of vanadium. In certain implementations, the vanadium compound used to form a vanadium oxide nanobelt can have an oxidation state of +3, +5, or a combination of both. For example, vanadium chloride ($VCl_3$), ammonium vanadate ($NH_4VO_3$), or both compounds can be used to produce a vanadium oxide nanobelt according to the present disclosure. It should be understood that $VCl_3$ is an example of a vanadium compound having a +3 oxidation state and that other anions may be substituted for chloride such as halogens (e.g., bromide, iodide, or fluoride) or molecular anions (e.g., hydroxide, sulfate, phosphate, nitrate, or cyanate). Further, $NH_4VO_3$ is provided as an example of a vanadium compound having a +5 oxidation state and other cations may be substituted for ammonium, such as a proton, an alkali metal (e.g., sodium potassium, cesium, etc.), or an alkaline earth metal (e.g., beryllium, magnesium, calcium, etc.).

Aspects of the alkali metal salt and the alkaline earth metal salt can include a counter ion (e.g., an anion). The terms alkali metal salt and alkaline earth metal salt are used in accordance with the regular meaning with reference to the period table. As used herein, the alkali metal salt includes a group I element as a cation, and the alkaline earth metal salt includes a group II element as a cation. Several non-limiting example of anions that may be included in the alkali metal salt and/or the alkaline earth metal salt include: halogens (e.g., fluoride, chloride, bromide, iodide), molecular anions (e.g., hydroxide, sulfate, sulfite, nitrate, nitrite, phosphate, or cyanate), and/or organic anions (e.g., carboxylates or phenolates).

In some implementations, the vanadium compound may include the alkali metal salt (e.g., $NaVO_3$), the alkaline earth metal salt (e.g., $Ca(VO_3)_2$), or a combination of both (e.g., $NaVO_3$ and $Ca(VO_3)_2$). Thus, while expressed as individual components, the vanadium compound, the alkali metal salt, and the alkaline earth metal salt are used to generally describe elemental components that are present in the reaction vessel.

Another example aspect of the method for forming a vanadium oxide nanobelt can include a stoichiometry for the vanadium included in the vanadium compound and the group II element included in the alkaline earth metal salt. In some implementations, the ratio of vanadium to the alkali earth metal can be about 45:5 to about 20:30, such as about 40:10 to about 25:25, or about 35:15 to about 30:20. For example, a method of producing a vanadium oxide nanobelt according to the present disclosure can include combining 4 mmol vanadium chloride and 4 mmol calcium nitrate with an alkali metal salt. Based on the molecular composition, the 4 mmol vanadium chloride contains about 4 mmol vanadium and the 4 molar calcium nitrate contains about 4 mmol of calcium, thus the resulting stoichiometry ratio of vanadium to alkali earth metal is about 25:25.

In certain implementations, the vanadium compound and one or more of the alkali metal salt and the alkaline earth metal salt can be combined with a solvent to create a solution or mixture. Typical solvents for use in certain implementations can include water, as well as organic solvents, such as alcohols (e.g., methanol, ethanol, propanol, and/or butanol); alkanes (e.g., pentane, hexane, cyclohexane, and/or decane); aryls (benzene, toluene, and/or xylene(s)); or other solvents including dimethyl formamide (DMF), dimethyl sulfoxide (DMSO), acetone, and tetrahydrofuran (THF). Additionally, combinations of these solvents may be used in certain implementations. An advantage of methods and materials disclosed herein is the ability to synthesize the vanadium oxide nanobelts using aqueous conditions, which can reduce safety hazards normally associated with using organic (typically flammable) solvents.

A further example aspect of the method for forming a vanadium oxide nanobelt includes the reaction conditions. Generally, reaction of the vanadium compound, the alkali metal salt, and the alkaline earth metal salt occurs in a sealed vessel such as an autoclave at a reaction temperature for a reaction time. In an example implementation, the reaction temperature can range from about 150° C. to about 210° C., such as about 160° C. to about 200° C., about 170° C. to about 200° C., or about 180° C. to about 195° C. Since the reaction time can depend on condition—such as reaction temperature and/or concentration—the reaction time may vary from about 10 hours to about 40 hours, such as about 12 to about 36, about 15 to about 30, about 18 to about 28, about 20 to about 26, or about 22 to about 24 hours.

In addition to temperature, aqueous reaction conditions can be described by a reaction pH. For example, after combining the vanadium compound with the alkali metal salt, and/or the alkaline earth metal salt, a base (e.g., sodium hydroxide, NaOH) can be added to adjust the reaction pH. The base can be added to adjust solution pH to between about 6.00 and about 8.00, such as about 6.25 to about 7.50, about 6.25 to about 7.00, about 6.50 to about 7.00, or about 7.00 (+/−0.01).

Generally, the described reaction conditions can be used to produce various embodiments. For instance, an embodiment according to the disclosure can include a molecular composition for a cathode material. The cathode composition may include a vanadium oxide nanobelt having an alkali metal, an alkaline earth metal, and a vanadium cation. As an example, a molecular composition for a cathode can include sodium (Na), calcium (Ca), vanadium (V), and oxygen (O), also referred to as NaCaVO.

An example aspect of the cathode composition can include an empirical formula describing the atomic proportions of the various elements. For example, the empirical formula of an example cathode composition including NaCaVO can be $NaCa_{0.6}V_6O_{16}$.

Another example aspect of the cathode composition can include the presence of water and/or the inclusion of water in the molecular composition as a hydrate. For instances where the molecular composition is a hydrate or includes a hydrate, the hydrate can be characterized by a number of water molecules. For example, a hydrate according to the present disclosure can include 1 to 4 water molecules, such as 2-4 or 3. Thus, an example embodiment according to the disclosure can include a composition for a cathode including $NaCaVO.3(H_2O)$, $NaCa_{0.6}V_6O_{16}.3(H_2O)$, $NaCa_{0.6}V_6O_{16}.2(H_2O)$, or combinations thereof.

In another example embodiment, cathode materials formed in accordance with the disclosure and/or described herein can be included as part of a battery. In an example implementation, the battery may also include an anode containing zinc to produce a zinc ion battery (ZIB).

An example aspect of batteries incorporating example cathodes according to the disclosure can include displaying improved energy storage properties such as longer retention of capacity and/or improved balance between energy density and power output. For instance, batteries according to the present disclosure may display greater than about 75% of capacity after about 10,000 charge-discharge cycles, relative to the first charge-discharge cycle. Over shorter cycling periods (e.g., 2,000 cycle), almost none, or no significant decrease in capacity is noted. These properties may provide advantages for use of these materials in large-scale energy storage for applications in grids. Further, an energy density of about 260 Wh kg' can be achieved using about 0.1 A/g.

Example 1

Example 1 discusses various methods and provides exemplary embodiments that may be understood in conjunction with the Drawings and Description provided herein. The materials and conditions described in the example are demonstrative and are not meant to constrain the scope of the disclosure only to the materials and conditions used.

Materials and Methods

Synthesis $NaCa_{0.6}V_6O_{16} \cdot 3H_2O$ (NaCaVO) nanobelts. The $NaCa_{0.6}V_6O_{16} \cdot 3H_2O$ nanobelts were prepared through a facile and scalable hydrothermal method. For a typical run, 4 mmol vanadium chloride ($VCl_3$) and 4 mmol calcium nitrate ($Ca(NO_3)_2 \cdot 6H_2O$) were first dissolved in 50 mL deionized (DI) water under vigorous stirring. Then, the pH value of the above clear solution was adjusted to ~7 by adding 1M NaOH solution. After stirring at 20° C. for 30 minutes, the mixture was loaded into a 100 mL autoclave with a Teflon liner and held at 190° C. for 24 hours. After being cooled to ambient temperature, the brownish red precipitate was thoroughly washed with deionized water and ethanol, and finally dried at 60° C. for 12 hours.

$NaCa_{0.6}V_6O_{16}$ (dry-NaCaVO) nanobelts. The anhydrous $NaCa_{0.6}V_6O_{16}$ (dry-NaCaVO) nanobelts were prepared by calcining the as-prepared $NaCa_{0.6}V_6O_{16} \cdot 3H_2O$ powder in air at 250° C. for 3 hours to remove the structural water.

Characterization

Phase and structure determination. X-ray diffraction (XRD) was performed on the NaCaVO samples using a Rigaku D/MAX-2100 with Cu Kα radiation (λ=1.5418 Å). The data were recorded from 5° to 80° with an interval of 0.02° and a scan speed of 2° min$^{-1}$. The Rietveld refinements were performed using the TOPAS-Academic software to analyze the XRD patterns. As a complementary tool, Raman spectroscopy was also employed with LabRAM HR800 to verify the structure determined by XRD.

Microstructure. The morphologies of the samples were captured with a ZEISS Ultra plus field emission scanning electron microscope (FESEM). The crystalline structures and morphologies of samples were also acquired with a high-resolution transmission electron microscope (HRTEM, H9500) operated at 300 kV. Microscopic morphologies and elemental mapping were obtained by a scanning transmission electron microscope (STEM, HD2000) and an energy-dispersive X-ray spectrometer (EDS).

Surface chemistry. The surface chemical compositions and oxidation states of the elements were collected by X-ray photoelectron spectroscopy (XPS, Kratos AXIS Ultra DLD) with Al Kα X-ray radiation (hv=1486.6 eV). Prior to the analysis, the cycled electrode powders were first washed with DI water and then thoroughly dried in a glove box. All the binding energies were corrected by adventitious C 1s at 284.6 eV. The spectra were analyzed by XPSPEAK41 software with the Shirley-type background.

Thermal analysis. Thermogravimetric analysis (TGA) was performed using a Netzsch STA 448 TGA/DSC (Germany) thermal analyzer. Specimens were placed in a Pt crucible with a lid, and TGA data were recorded under air with a flow rate of 50 mL min$^{-1}$ while ramping from room temperature to 600° C. at a rate of 2° C. min$^{-1}$, holding at 600° C. for 1 hour and then cooling naturally to room temperature.

Chemical analysis. The concentration of elements of interest was analyzed by an inductively coupled plasma optical emission spectrometer (Shimadzu Corporation ICPS-8100).

Specific surface area analysis. Brunauer-Emmett-Teller (BET) surface areas of samples were analyzed by a Quantachrome QUADRASORB SI instrument based on physical adsorption at 77.3 K.

Electrochemical Tests

Battery cell assembly. Electrochemical tests were carried out using CR2032-type coin cells. To prepare a pure NaCaVO electrode, 66 wt % $NaCa_{0.6}V_6O_{16} \cdot 3.5H_2O$ nanobelts, 20 wt % Super-P, and 14 wt % polyvinylidene fluoride (PVDF) were thoroughly mixed and dispersed into N-Methyl pyrrolidone (NMP). The resultant slurry was then coated uniformly onto φ14 mm stainless steel meshes with ~1.1 mg cm$^{-2}$ active mass loading, followed by vacuum drying at 120° C. for about 12 hours and compression at 10 MPa. In a ZIB, zinc foil was used as the anode, 3 M $Zn(CF_3SO_3)_2$ as the electrolyte, and glass microfiber filters (Whatman, Grade GF/A) as the separator.

Electrochemical testing. The CR2032-type coin cells were assembled in air and tested using a LAND battery testing system (CT2001A) in a potential window of 0.4-1.5 V (vs. Zn/Zn$^{2+}$). Cyclic voltammograms (CV) and electrochemical impedance spectroscopy (EIS) were performed in a three-electrode configuration using a Solartron 1260/1287 electrochemical workstation. A Zn-ring and Zn-plate were used as reference and counter electrode, respectively. The galvanostatic intermittent titration technique (GITT) was employed to determine Zn$^{2+}$ diffusivity using a series of galvanostatic discharge pulses of 10 minutes at 50 mA g$^{-1}$, followed by a 1-hour relaxation process. The Zn$^{2+}$ diffusion coefficient ($D_{Zn^{2+}}^{GITT}$) is calculated by:

$$D_{Zn^{2+}}^{GITT} = \frac{4L^2}{\pi\tau}\left(\frac{\Delta E_s}{\Delta E_t}\right)^2 \tag{6}$$

where τ is the constant current pulse time; L corresponds to the Zn$^{2+}$ diffusion length, which is equal to the thickness of the electrode; ΔE is the change of steady-state voltage during a single-step GITT experiment, and $\Delta E_t$ is the change in cell voltage at a constant current minus IR-loss during each galvanic step.

Computational Method

Density functional theory (DFT) was performed by using the Vienna ab Initio Simulation Package (VASP). Herein, all ground-state electronic calculations were performed by Perdew-Burke-Ernzerhof (PBE) formulation of generalized gradient approximation (GGA). The core electrons were treated within the projector augmented wave (PAW) method and valence configurations include the H (1s$^1$), O (2s$^2$2p$^4$), (3p$^6$3d$^4$4s$^1$), Na (3s$^1$), Ca (3p$^6$4s$^2$), and Zn (3d$^{10}$4p$^2$) states. Electronic structure was described within a plane-wave basis with a kinetic energy cutoff of 400 eV. For thermodynamic calculations, such as lattice parameters, and total energy, DFT+U formalism was applied to account for strong on-site Coulombic interactions of the V 3d-electrons, with a specific on-site potential of U=3.25 eV. To explicitly account for van der Waals' interactions between layers and structural water, van der Waals-corrected D3 method of Grimme was used for all calculations. For bulk structure, the lattice constants and atomic positions were both fully relaxed until a maximum energy difference and residual force on atoms converge was reached at $10^{-1}$ eV and 0.05 eV/Å, respectively. The residual force on atoms was changed to below 0.1 eV/Å for the surface calculation to make the structure easier to converge.

To maintain a similar stoichiometry as the experiment structure $NaCa_{0.6}V_6O_{16} \cdot 3H_2O$, a specific model of NaCaVO was constructed with two Na atoms and one Ca atom in the unit cell corresponding to structure $NaCa_{0.5}V_6O_{16} \cdot 3H_2O$. The Brillouin zone was sampled with 2×8×2 to predict the lattice constants of the unit cell. To model ionic diffusion in the selected host structure, the quasi-empirical bond-valence (BV) method with high calculation efficiency is employed to obtain the initial knowledge of possible ionic transportation channels, and the climbing image-nudged elastic band (CI-NEB) method as implemented in VASP is used to evaluate the diffusion barriers. DFT was used instead of DFT+U because an early first-principles calculations of multivalent-ion migration in oxide spinels has shown a pronounced metastability of electronic states along the ion migration path with U, resulting in a poor computational convergence. The convergence threshold of the total energy was set to $1 \times 10^{-4}$ eV, and a tolerance of 0.1 eV/A for the forces was used in the CI-NEB procedure.

The Voltage Calculation

The chemical potential difference between the cathode and the anode material provides a direct measure of the expected open circuit voltage (OCV). With Zn metal as the anode, the average voltage is a thermodynamic quantity that can be calculated as:

$$V = -\frac{E^{cathode}(x_2) - E^{cathode}(x_1) - E(Zn)}{2(x_2 - x_1)e}, \quad x_2 > x_1 \quad (7)$$

where $E^{cathode}$ is the Gibbs free energy of the compound approximated by the total energy calculated by DFT at 0 K; $x_1$ and $x_2$ are the numbers of $Zn^{2+}$ intercalated, respectively; E(Zn) is the Gibbs free energy per atom of the metallic Zn anode (hcp); e represents the electronic charge. At $x_1=0$ and $x_2=1$, the value of OCV can be obtained. The calculated OCVs of $NaCa_{0.5}V_6O_{16} \cdot 3H_2O$ and $NaCa_{0.5}V_6O_{16}$ calculated are 1.50 V and 1.36 V, respectively.

Results

Synthesis and Characterization of NaCaVO

The NaCaVO was synthesized through a new controllable hydrothermal method by reacting $VCl_3$ and $Ca(NO_3)_2$ in NaOH aqueous solution at 190° C. for 24 hours (refer to synthesis section of Experimental Methods for details). The formation of pure NaCaVO phase is confirmed by X-ray diffraction (XRD) and subsequent Rietveld refinement of FIG. 1A, showing that NaCaVO has a monoclinic structure with space group of A2/m and lattice parameters of a=12.2552(4) Å, b=3.6122(6) Å, c=18.3627(1) Å, α=γ=90.0°, and β=117.8°. The reliability factors of the refinement are excellent at $R_p$=3.5% and $R_{wp}$=4.7%. In NaCaVO, metal ions ($Na^+$ and $Ca^{2+}$) and structural water are situated within galleries of $V_3O_8$ as "pillars" and "binder," respectively, to stabilize the layered structure. By comparing the total energy of NaCaVO models with different layer arrangements of $Ca^{2+}$ and $Na^+$, DFT calculations point out that $Ca^{2+}$ and $Na^+$ prefer to separately situate in alternate $V_3O_8$ layers, in which $Na^+/Ca^{2+}$ ions are predicted to coordinate with O from some structural $H_2O$, as well as $V_3O_8$ layers, while some structural $H_2O$ is also bound to O of the upper and lower $V_3O_8$ layers by H-bond. The $V_3O_8$ layers are comprised of $VO_5$ tetragonal pyramids and $VO_6$ octahedra which are shared by either edges or corners.

The existence of layered $V_3O_8$ structure is also supported by Raman spectrum, where detailed vibrational mode assignments can be determined. The existence of Na, Ca, V and O in the as-prepared NaCaVO is evident in X-ray photoelectron spectroscopy (XPS) profile and energy-dispersive X-ray spectroscopy (EDS) mapping in a scanning transmission electron microscope (STEM), respectively. The precise cation stoichiometry was determined by inductively coupled plasma optical emission spectroscopy (ICP-OES), yielding an atomic ratio of Na:Ca:V=1:0.6:6. Thermogravimetric analysis (TGA) further informs that the number of structural water per NaCaVO formula is 3. Therefore, the chemical stoichiometry of the as-prepared NaCaVO is $NaCa_{0.6}V_6O_{16} \cdot 3H_2O$. The Brunauer-Emmett-Teller (BET) surface area analysis gives the as-prepared NaCaVO a specific surface area of about 144 $m^2$ $g^{-1}$.

Figure 1B:
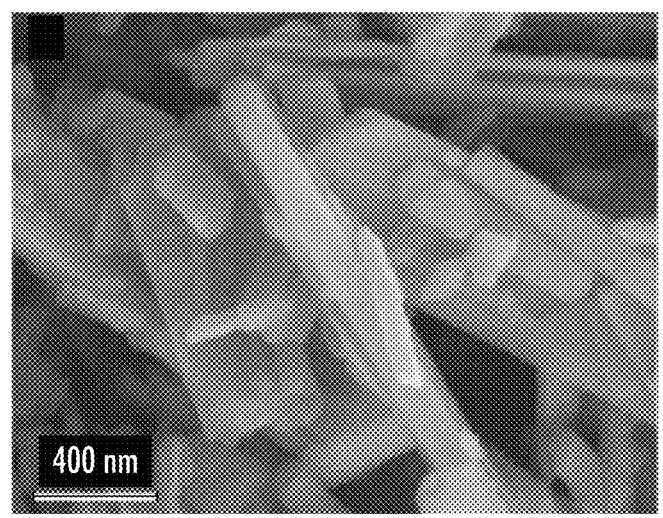
FIGS. 1B-1D illustrate microscopy images for an example embodiment according to the disclosure.
Figure 1C:
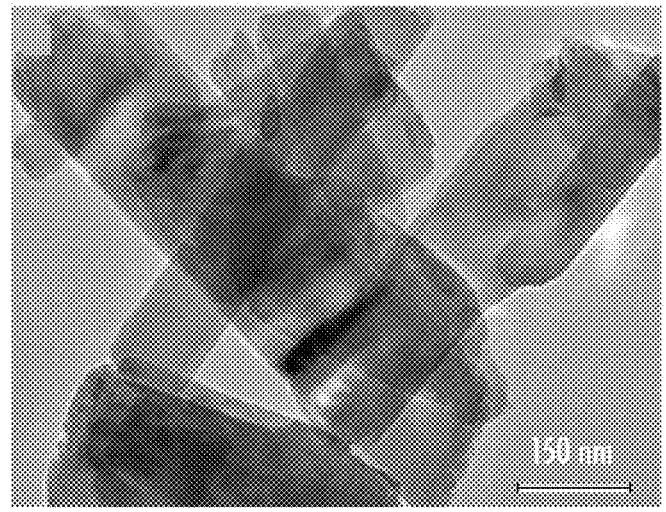
Figure 1D:
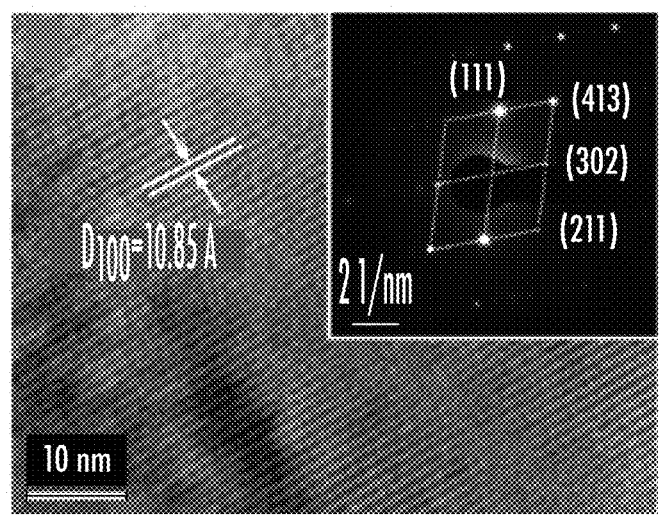

The morphology and particle sizes of the as-synthesized NaCaVO revealed by the scanning electron microscope (SEM) and transmission electron microscope (TEM) are shown in FIGS. 1B and 1C. The SEM images reveal NaCaVO with a nanobelts morphology in variable sizes and stacking feature. The TEM images further uncover that the majority of NaCaVO nanobelts has a dimension of ~600 nm in length and ~100 nm in width, and the stacked nanobelts can be easily broken up by ultra-sonication. The crystal structure of NaCaVO is also verified by high-resolution (HR) TEM and selected-area electron diffraction (SAED) shown in FIG. 1D. The d-spacing is found to be 10.85 Å for the (100) plane, which agrees with $d_{100}$=10.84 Å from the XRD refinement results. The SAED pattern in the inset of FIG. 1D indicates the intrinsic single-crystal structure and is consistent with those refined crystallographic parameters of NaCaVO.

The Initial Electrochemical Performance

Figure 2A:
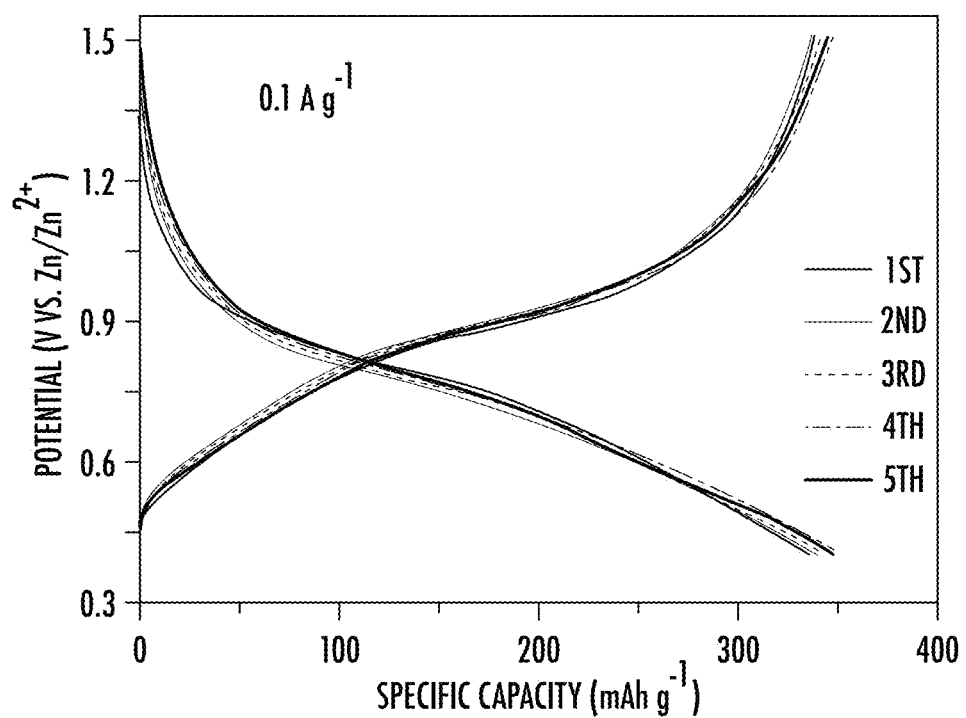
FIGS. 2A-2D display graphs displaying example characterization data for example embodiments of the disclosure.
Figure 2B:
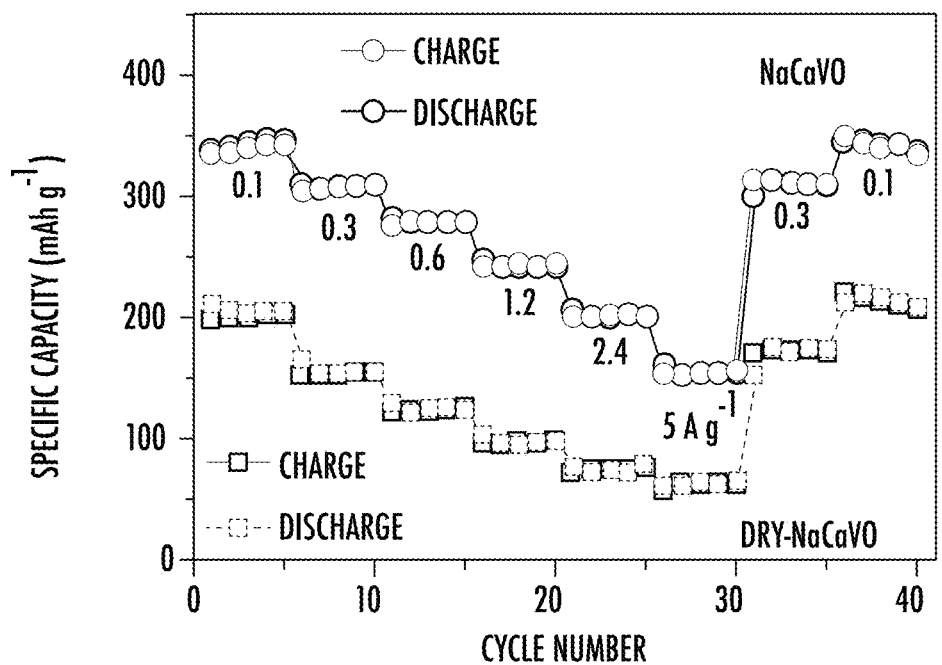
Figure 2C:
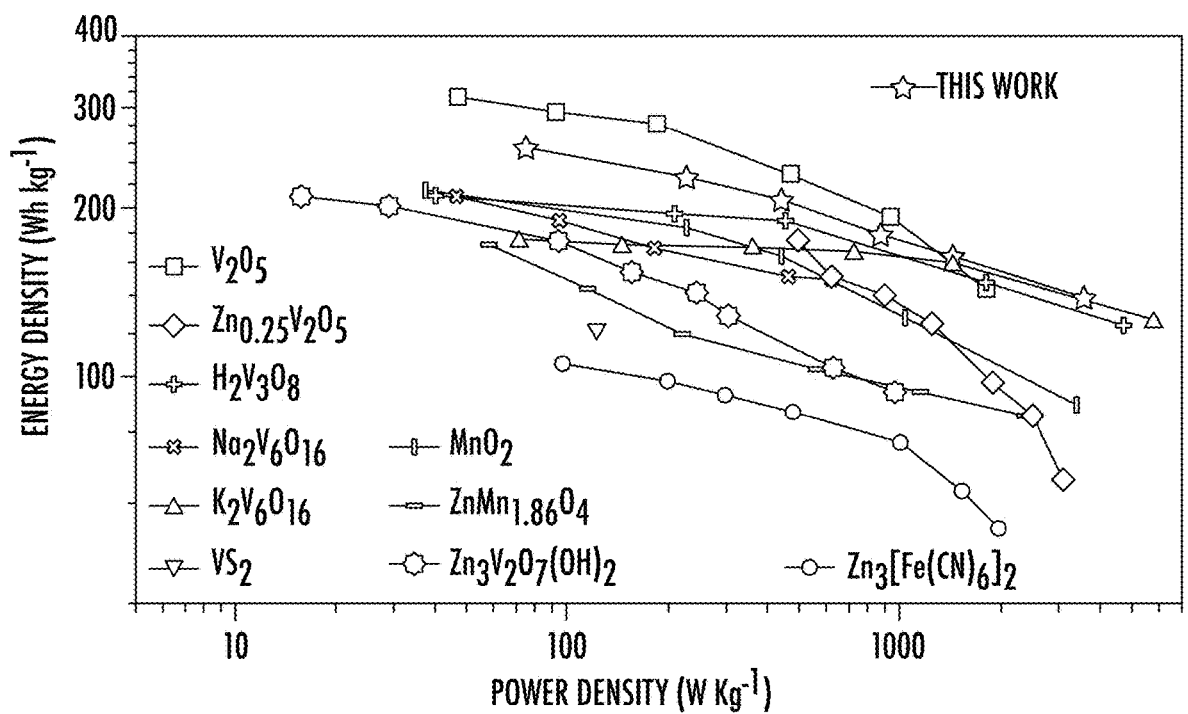
Figure 2D:
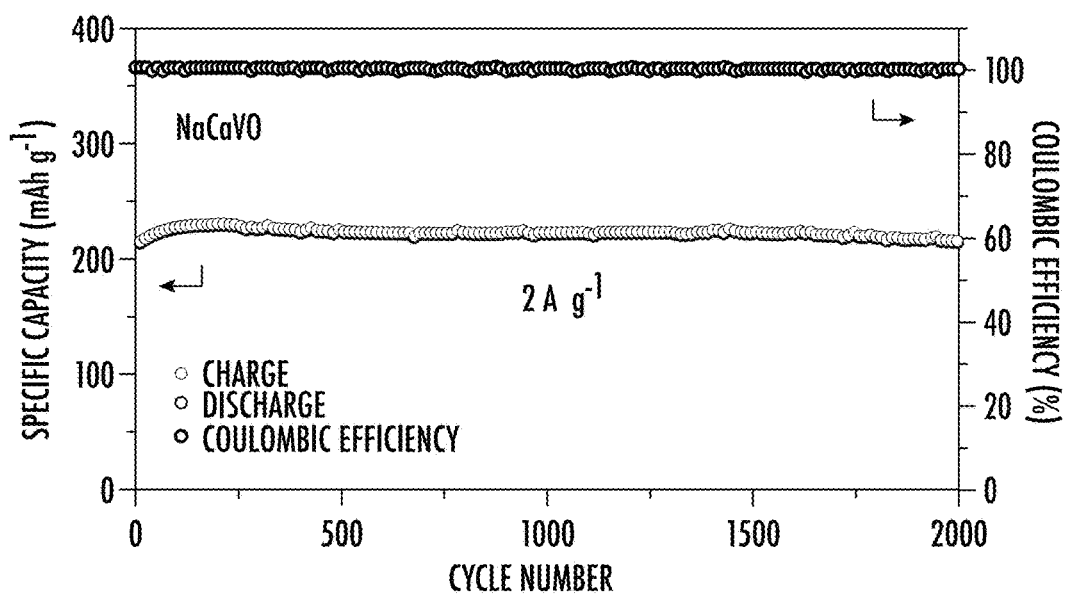

The electrochemical performance of NaCaVO as a cathode is evaluated in coin-cell type ZIBs consisting of a Zn-metal anode and aqueous 3M $Zn(CF_3SO_3)_2$ electrolyte. Five cyclic voltammetry (CV) curves collected between 0.4 and 1.5 V vs. $Zn/Zn^{2+}$ at a scan rate of 0.1 mV $s^{-1}$ were performed. The difference between the first cycle and the rest of four cycles may represent a pre-activation process of the fresh electrode. Meanwhile, the rest of four cycles are mostly overlapping, indicating good reversibility after the pre-activation. The galvanostatic discharge/charge profiles of the first five cycles at 0.1 A $g^{-1}$ are shown in FIG. 2A. The open circuit voltage (OCV) of the battery is ~1.25 V, close to the theoretical OCV (1.5 V) (see details in Experimental Methods for the OCV calculation). Apart from the first discharge curve, the rest discharge and charge curves are overlapping, further indicating the nature of high reversibility of $Zn^{2+}$ storage in the layered NaCaVO. A discharge capacity of 347 mAh $g^{-1}$ with 100% coulombic efficiency is obtained at 0.1 A $g^{-1}$; the high coulombic efficiency also indicates good reversibility of the $Zn^{2+}$ (de-)intercalation process. The specific discharge/charge capacity at different current densities for the first five cycles are shown in FIG. 2B. The derived discharge capacities are 347, 310, 279, 243, 202, and 154 mAh $g^{-1}$ at 0.1, 0.3, 0.6, 1.2, 2.4 and 5.0 A $g^{-1}$, respectively. Rooted in its excellent rate-capacity, FIG. 2C of Ragone plot (energy density vs. power density) indicates that NaCaVO is among the best candidate cathode material for ZIBs. To put this into perspective, the NaCaVO-based ZIB exhibits an energy-density/power-density of 254 Wh $kg^{-1}$/74 W $kg^{-1}$ and 138 Wh $kg^{-1}$/3,520 W $kg^{-1}$ (based on the mass of NaCaVO) at 0.1 and 5.0 A $g^{-1}$, respectively. The NaCaVO (this work) outperforms $Na_2V_6O_{16} \cdot 3H_2O$ at high power (rate) regime. The excellent rate performance enables the battery to be charged/discharged at a fast rate, which is highly desirable for large-scale SES applications.

In addition, FIG. 2B also shows 100% capacity recovery after the current density resumes to 0.3 and 0.1 A $g^{-1}$ from 5 A $g^{-1}$ excursion. At 2 A $g^{-1}$, an impressive 94% of the highest capacity (231 mAh $g^{-1}$) is retained after 2,000 cycles. These results suggest that NaCaVO possesses excellent electrochemical reversibility and structural stability. Other than the excellent cycling stability, the level of specific capacity obtained is also better than, or at least comparable to, many currently reported high-performance ZIB cathodes such as $V_2O_5 \cdot nH_2O$, $H_2V_3O_8$, $Na_2V_6O_{16} \cdot 3H_2O$, $K_2V_6O_{16} \cdot 3H_2O$, or $Zn_{0.25}V_2O_5 \cdot nH_2O$, $MnO_2$; see FIG. 2C for a full comparison. On the other hand, the similarity in the shape of discharge/charge profiles at different rates suggests a facile charge-transfer kinetics of NaCaVO. A high $Zn^{2+}$-diffusion coefficient, $\sim 10^{-8}$ $cm^2 s^{-1}$, was obtained for NaCaVO nanobelts using galvanostatic intermittent titration technique (GITT).

Zn-Ions Migration Pathways in NaCaVO

Figure 3A:
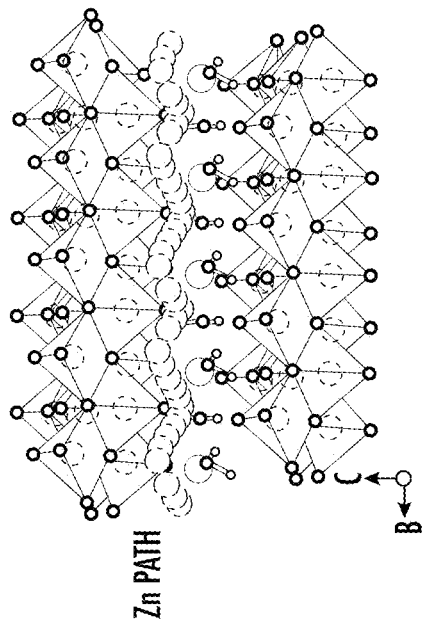
FIGS. 3A-3C illustrate representations of example embodiments according to the disclosure.
Figure 3B:
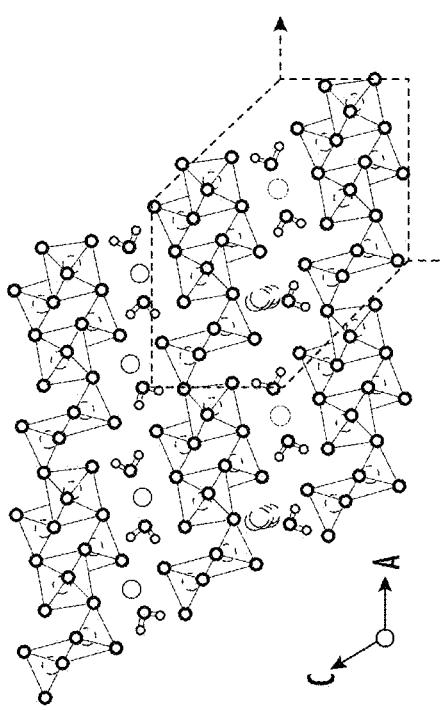
Figure 3C:
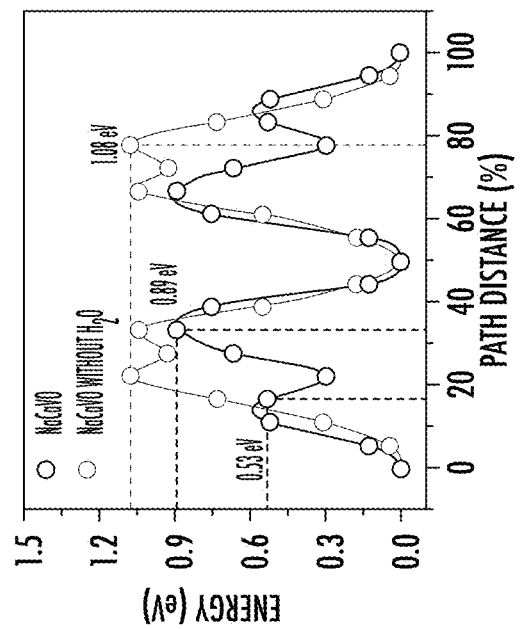
Figure 3D:
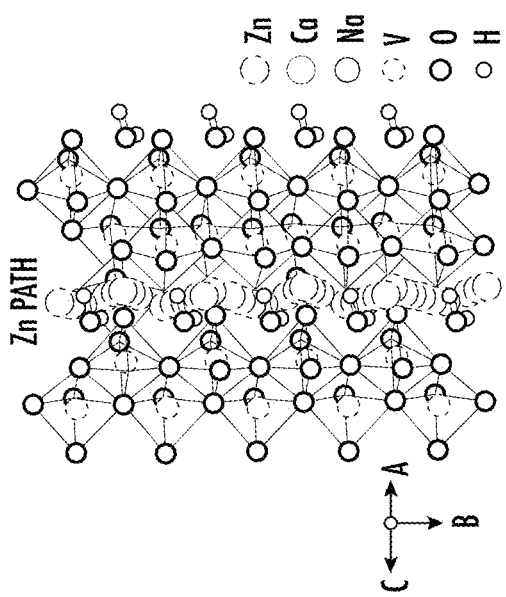
FIG. 3D illustrates a graph displaying example data for energy vs. path distance of NaCaVO and NaCaVO without $H_2O$ according to example embodiments of the disclosure.

To fundamentally understand the migration behavior of $Zn^{2+}$ inside NaCaVO layered structure, the quasi-empirical bond-valence (BV) method with high calculation efficiency is employed to obtain the initial knowledge of possible ionic transport channels, followed by using the climbing image-nudged elastic band (CI-NEB) method to evaluate the diffusion barriers. The calculated results are shown in FIG. 3A-3D, where $Zn^{2+}$ is shown to mainly diffuses along b axis with a small deviation in c axis (i.e., a zigzag-type diffusion pathway). The calculated diffusion barrier for NaCaVO with structural water is only 0.89 eV, indicating an easy $Zn^{2+}$-migration in the bulk of NaCaVO. In addition, FIG. 3D illustrates that the structural water can benefit $Zn^{2+}$-migration in NaCaVO. To put this into the perspective, the calculated diffusion barrier of NaCaVO without structural water is 1.08 eV, which is about 0.2 eV higher than that with structural water. The lower diffusion barrier infers that NaCaVO with structural water should show a better rate capability and cyclability than that without structural water.

The Role of Structural Water

To experimentally demonstrate the vital role of structural water, a hydrated NaCaVO sample was purposely calcined at 250° C. for 3 hours in air (hereinafter denoted as "dry-NaCaVO"). The refined XRD pattern of dry-NaCaVO shows that the $V_3O_8$ layers can still be retained but in a different crystallography. The TGA curve of dry-NaCaVO confirms that most of the structural water has been removed, and the XRD results show the small weight loss after 250° C. is mainly due to the phase transformation. It is to be noted that in the hydrated NaCaVO and dry-NaCaVO, those $VO_5$ tetragonal pyramids and $VO_6$ octahedra in $V_3O_8$ layers remain mostly the same, where both $Na^+$ and $Ca^{2+}$ are alternately situated within the galleries of $V_3O_8$ layers. However, due to the loss of structural water, the gallery spacing of $V_3O_8$ layers in dry-NaCaVO becomes smaller than that in NaCaVO—i.e., 6.7 vs. 8.1 Å. Like NaCaVO, dry-NaCaVO still displays the nanobelt morphology. However, FIG. 2B indicates that dry-NaCaVO exhibits poorer $Zn^{2+}$-storage performance (e.g., specific capacity, rate capability, and cycling stability) than NaCaVO, inferring that structural water plays a crucial role in $Zn^{2+}$ (de-) intercalation. A comparison of the structures of NaCaVO and dry-NaCaVO in FIGS. 4A and 4B reveals that the two Zn-ion host sites in NaCaVO are degenerated to only one in dry-NaCaVO as a result of reduced gallery spacing, which subsequently decreases the $Zn^{2+}$-storage capacity. Compared to NaCaVO, the lower rate-capacity of dry-NaCaVO is also in line with smaller diffusion-coefficient and higher energy barrier (see FIG. 3D) for $Zn^{2+}$-migration.

The Pseudocapacitive Behavior

Figure 5A:
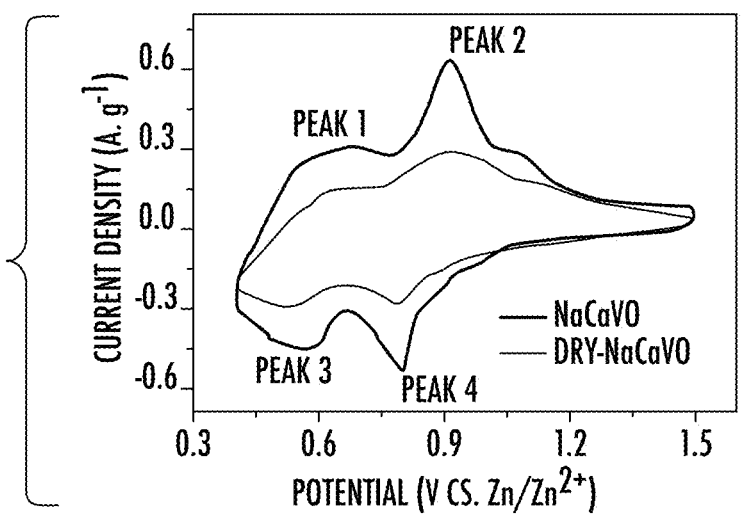
FIGS. 5A-5F illustrate graphs displaying example data for example embodiments according to the disclosure.

To further understand the intercalation behavior of $Zn^{2+}$ in NaCaVO and dry-NaCaVO, CV measurements with three-electrode configuration were carried out at different scan rates from 0.3 to 1.0 mV $s^{-1}$. Shown in FIG. 5A as an example are CV curves of NaCaVO and dry-NaCaVO measured at 0.3 mV $s^{-1}$ scan rate, where two pairs of similar redox peaks but with different peak current densities are observed. These two pairs of redox peaks correspond to the changes in oxidation-state of V from $V^{5+}$ to $V^{4+}$ (Peak 2 and 4) and $V^{4+}$ to $V^{3+}$ (Peak 1 and 3); the former redox reaction takes place at the same potential of 0.80/0.91 V for NaCaVO and dry-NaCaVO, whereas the latter redox reaction takes place at different potentials: 0.56/0.67 V for NaCaVO and 0.52/0.64 V for dry-NaCaVO. The differences in peak current density and potential imply that the structural water plays a role in $Zn^{2+}$-tintercalation associated with $V^{4+}$ to $V^{3+}$ redox reaction at low potential. Upon increasing the scan rate, CV curves remain a similar shape with similar four characteristic peaks.

Generally speaking, the peak current (i) of CVs can be related to scan rate (v) by an empirical power-law relationship to describe a combination of surface-controlled capacitive effects ($i_1=k_1 v$) and diffusion-controlled $Zn^{2+}$ (de)intercalation process ($i_2=k_2 v^{1/2}$):

$$i=k_1 v+k_2 v^{1/2} \approx a v^b \qquad (1)$$

where $k_1$, $k_2$, a and b are variable parameters with b=0.5 for a diffusion-controlled charge-transfer process and 1.0 for a surface-controlled capacitive process.

Figure 5B:
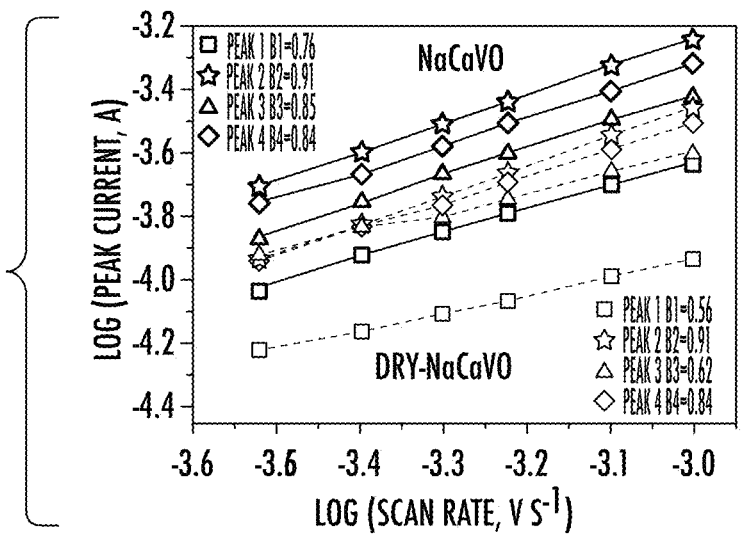
Figure 5C:
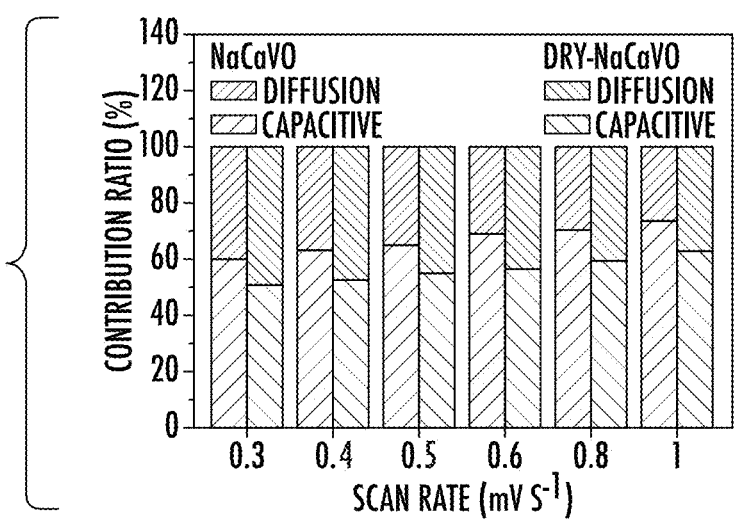

FIG. 5B shows b-values obtained from the slopes of log(i) vs. log (v) (i.e., 0.76, 0.91, 0.85, 0.84 and 0.56, 0.91, 0.62, 0.84) for the four redox peaks observed in NaCaVO and dry-NaCaVO, respectively. Note that the b-values associated with peak 2 and 4 are identical for NaCaVO and dry-NaCaVO, implying the capacitive effect associated with peak 2 and 4 ($V^{5+}/V^{4+}$ redox couple) is independent of structural water. On other hand, the b-values associated with peak 1 and 3 ($V^{4+}/V^{3+}$ redox couple) are very different: 0.76/0.85 vs. 0.56/0.62 for the two samples, signaling that structural water affect the $V^{4+}/V^{3+}$ redox couple at low potentials. The magnitude of the b-values for the two samples also implies that the charge storage process involves both surface-controlled capacitance and diffusion-limited redox reactions, but with more capacitive component in NaCaVO (60% at 0.3 mV $s^{-1}$) than in dry-NaCaVO (50%) as quantified from eq. (1). The capacitive contribution ratios at other scan rates are also given in FIG. 5C. With the scan rate increasing from 0.3 to 1.0 mV $s^{-1}$, the ratio of capacitive contribution of both samples is increased (i.e., from 60 to 73% for NaCaVO and 50 to 63% for dry-NaCaVO), but the absolute capacitive percentage is higher for NaCaVO than dry-NaCaVO, suggesting that the structural water promotes the capacitance-type charge storage.

To determine whether the origin of capacitive contribution arises from pseudocapacitance or from conventional double layer capacitance, the surface-area-normalized capacitance was calculated by:

$$C = \frac{A}{Sv\Delta E} \quad (2)$$

where C (F cm$^{-2}$), S (cm$^2$), A, $\Delta E$ (V), and v (V s$^{-1}$) are specific capacitance, surface area of the electrode, integral area of the capacitive contribution of CV loop, potential window in the CV, and scan rate, respectively. According to the CVs of NaCaVO at different scan rates, C values are found to vary from 169 to 175 uF cm$^{-2}$ in the scan rate of 0.3 to 1.0 mV s$^{-1}$, much higher than the double layer capacitance which is typically in the range of 10-50 uF cm$^{-2}$ for a typical conductive electrode surface in aqueous electrolyte. Therefore, it is concluded that capacitance behavior for Zn$^{2+}$-storage in NaCaVO is pseudocapacitive in nature. From previous studies on the pseudocapacitance of hydrated RuO$_2$ (bulk H$^+$ insertion) and Nb$_2$O$_5$ (bulk Li$^+$ insertion), the observed pronounced pseudocapacitive effect on the NaCaVO cathode might be derived from the fast Zn$^{2+}$-diffusion in the NaCaVO. This hypothesis is indirectly supported by the fact that a stronger pseudocapacitive effect is observed in the presence of structural water, which promotes the Zn$^{2+}$-diffusion by lowering the energy barrier from theoretical calculation (see FIG. 3D) and GITT measurement. It is further speculated that the pronounced pseudocapacitive behavior might be responsible for the high rate-capacity observed in most of hydrated V-oxide based ZIB cathodes.

Interfacial Charge-Transfer Kinetics

Figure 5D:
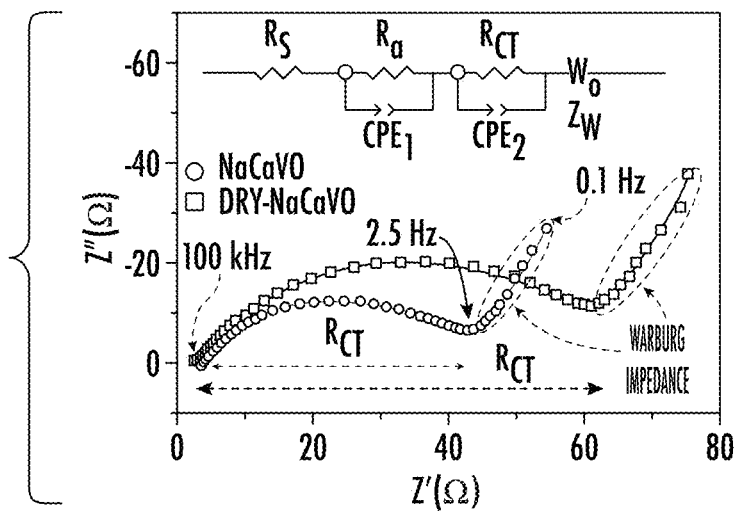

To further unravel the kinetics of Zn$^{2+}$ transfer at the interface of cathode/electrolyte, electrochemical impedance spectroscopy (EIS) was conducted on a three-electrode ZIB cell, by which the electrode process at the NaCaVO or dry-NaCaVO cathode can be separately evaluated from the Zn anode. Before each EIS measurement, the cell was held at OCV (~1.25 V) for 30 minutes to ensure the interfacial equilibrium. FIG. 5D compares EIS spectra of NaCaVO/electrolyte and dry-NaCaVO/electrolyte in a frequency range of 0.1 Hz-100 KHz. The equivalent-circuit fitting (inset in FIG. 5D) was carried out to extract electrode kinetic parameters, yielding an Zn$^{2+}$-adsorption-related resistance $R_a$=0.6Ω (or 0.9 Ωcm$^2$) for NaCaVO vs. 1.3Ω (or 2.0 Ωcm$^2$) for dry-NaCaVO, and charge transfer resistance $R_{CT}$=38.4Ω (or 59.1 Ωcm$^2$) for NaCaVO vs. 60.1Ω (or 92.5 Ωcm$^2$) for dry-NaCaVO. These results suggest that structural water can facilitate Zn$^{2+}$ adsorption process, which is consistent with the DFT-calculated Gibbs free energies of Zn-adsorption shown in FIG. 6 (i.e., -2.02 for NaCaVO vs. -0.75 eV for dry-NaCaVO). In addition, it is also observed that the structural water lowers $R_{CT}$, which is likely benefited from the lowered Zn-adsorption energy, enlarged gallery spacing, and additional sites for Zn-ion storage provided by the structural water.

To understand the nature of the interfacial charge transfer, temperature dependent EIS was conducted from 42 to 82° C. As expected, FIG. 5F of $\ln R_{CT}^{-1}$ vs. 1000/T plot shows that $R_{CT}$ follows Arrhenius law. The activation energy, Ea, obtained from the slope of the line is 20.2 kJ/mol for NaCaVO and 27.5 kJ/mol for dry-NaCaVO, respectively, comparable to those observed in H$_2$V$_3$O$_8$ (19.5 kJ/mol). Compared to dry-NaCaVO, the lower charge transfer Ea for NaCaVO again suggests that structural water is beneficial to the interfacial charge transfer. This experimental result is agreed by Zn$^{2+}$-diffusion barriers calculated from DFT in FIG. 6, where the Zn$^{2+}$ diffusion barrier from surface to bulk for NaCaVO is 0.52 eV, which is 0.10 eV lower than dry-NaCaVO, implying that structural water indeed benefits the Zn$^{2+}$ transfer at the interface.

Figure 5E:
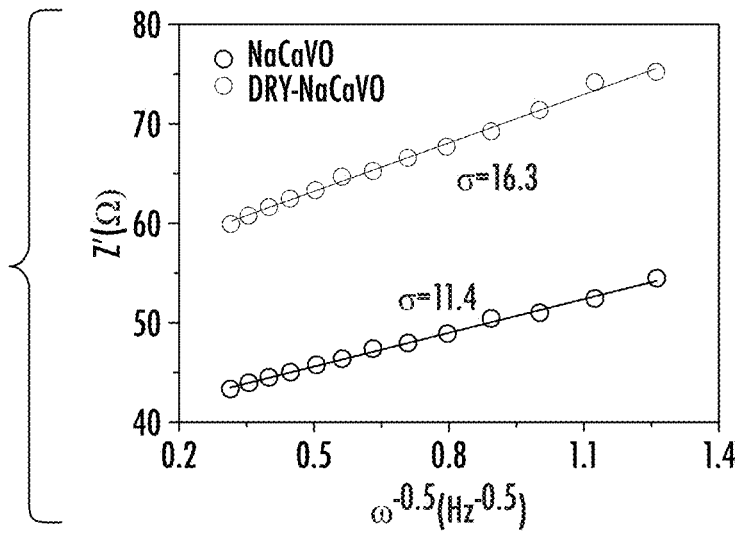
Figure 5F:
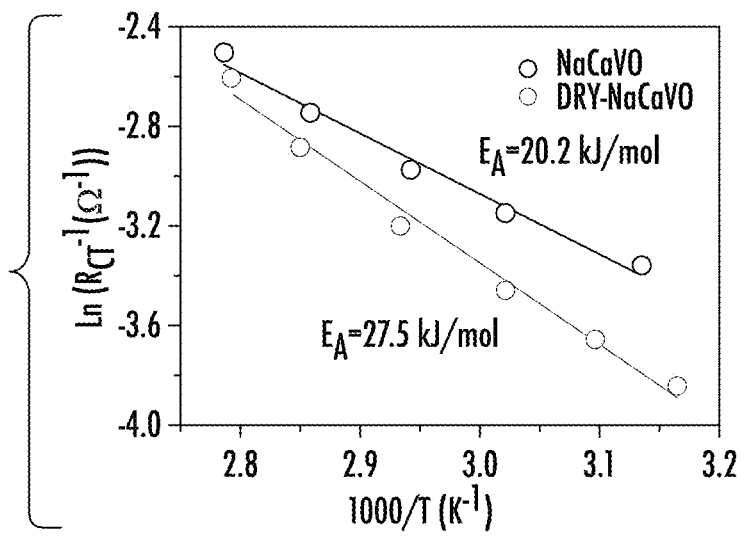

Additional evidence that shows a faster Zn$^{2+}$-diffusion in NaCaVO than dry-NaCaVO is the Warburg factor (σ) shown in FIG. 5E (i.e., σ=11.4 for NaCaVO vs. 16.3 for dry-NaCaVO). This result is in line with GITT findings, where the Zn$^{2+}$ diffusion-coefficient in dry-NaCaVO is shown lower than that in NaCaVO, as well as CV analysis, in FIG. 5B showing that the b values are generally higher for NaCaVO than for dry-NaCaVO.

Up to this point, three individual Zn-(de)intercalation processes—surface Zn$^{2+}$-adsorption at the interface, Zn$^{2+}$ charge-transfer from the interface to bulk, and Zn$^{2+}$ migration in the bulk—have been established. For each process, the structural water in NaCaVO plays a beneficial role in enlarging gallery spacing and providing additional Zn-ion storage sites, thus accelerating charge-transfer process and enhancing the battery performance.

Composition Vs. State-of-Charge (SOC)

Figure 7A:
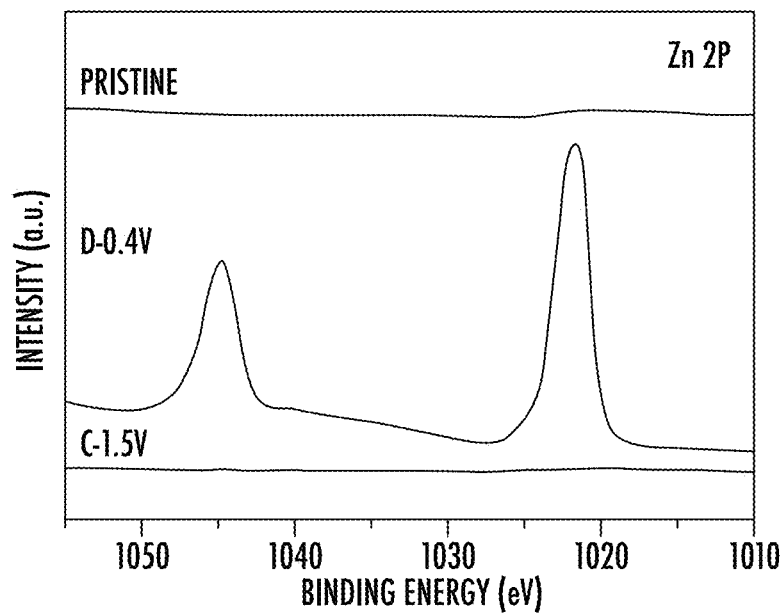
FIGS. 7A-7C illustrate graphs displaying example data for example embodiments according to the disclosure.

To decipher the composition-SOC relationship in the NaCaVO nanobelts during Zn$^{2+}$ (de-)intercalation, XPS was used to analyze the surface chemistry of NaCaVO at different SOCs. FIG. 7A shows no Zn in the pristine sample. At SOC=0.4 V, two strong peaks at 1,022 and 1,045.2 eV corresponding respectively to Zn 2p$_{3/2}$ and Zn 2p$_{1/2}$ appear, indicating that a significant amount of Zn$^{2+}$ has been intercalated into NaCaVO. Comparatively, at SOC=1.5V, a minimal Zn$^{2+}$ signal is detected, inferring almost a complete (de-)intercalation of Zn$^{2+}$ from NaCaVO nanobelts.

Figure 7B:
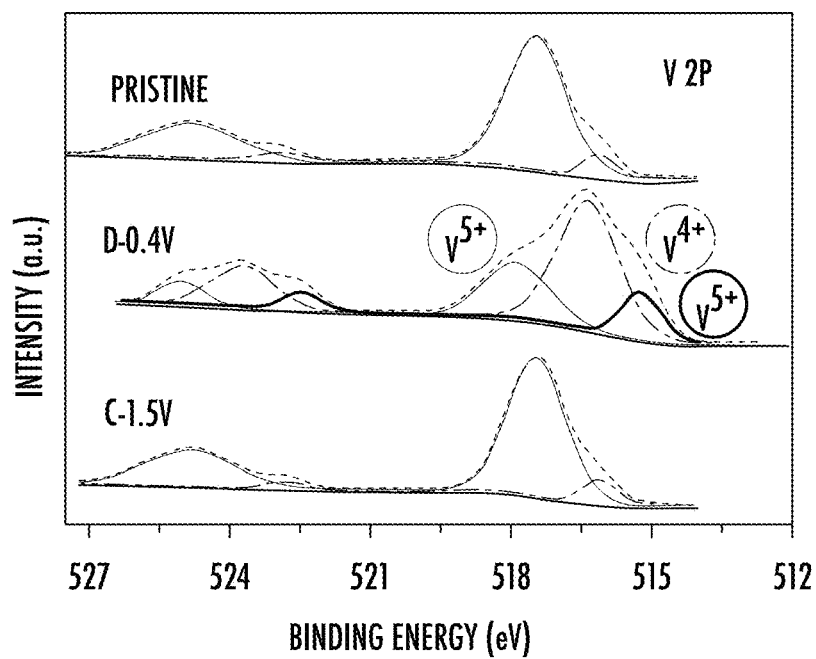
Figure 7C:
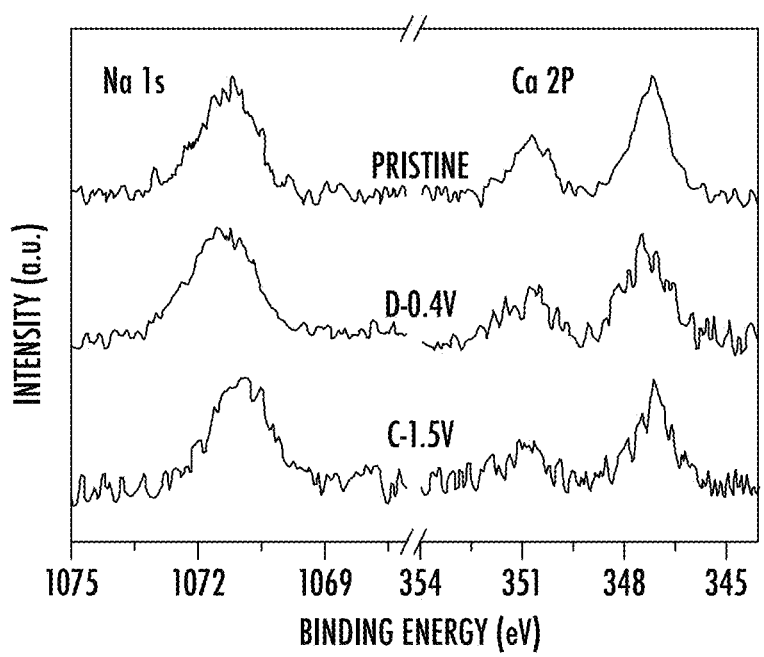

Correspondingly, compared to the pristine state, FIG. 7B shows a V$^{3+}$ component at 515 eV in a fully discharged NaCaVO, while the intensity of V$^{4+}$ is significantly enhanced with an apparent decrease in the intensity of V$^{5+}$. This finding indicates a partial reduction of V$^{5+}$ (V$^{4+}$) to V$^{4+}$ (V$^{3+}$) during Zn$^{2+}$ intercalation. To understand the change in V-oxidation-state during charge transfer, the density of states (DOS) were calculated for NaCaVO with and without Zn intercalation. It was noted that the DOS of V is suppressed below the Fermi level after the Zn intercalation in NaCaVO, implying that V in NaCaVO accepts electrons from Zn and leads to a decrease in the oxidation state of V. Upon charging, the V-oxidation process takes place reversibly as evidenced by the fact that the V-2p spectrum featuring major V$^{5+}$ and minor V$^{4+}$ like that of the pristine sample is reproduced at the fully charged state. In addition, FIG. 7C shows Ca-2p and Na-1s peaks still exist in the NaCaVO at the three states (i.e., pristine state, fully discharged state, and fully charged state). Thus, Ca$^{2+}$ and Na$^+$ are stable and immobile during Zn$^{2+}$ (de-)intercalation.

Figure 6C:
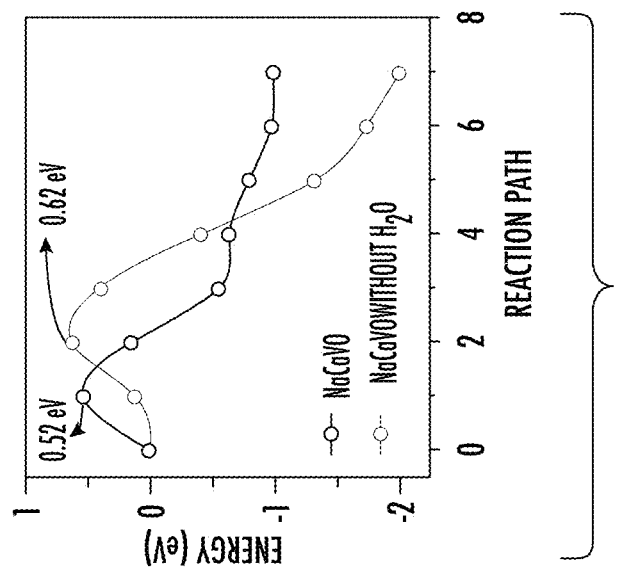
FIG. 6C illustrates a graph displaying predicted energy vs. reaction path according to example embodiments of the disclosure.
Figure 7D:
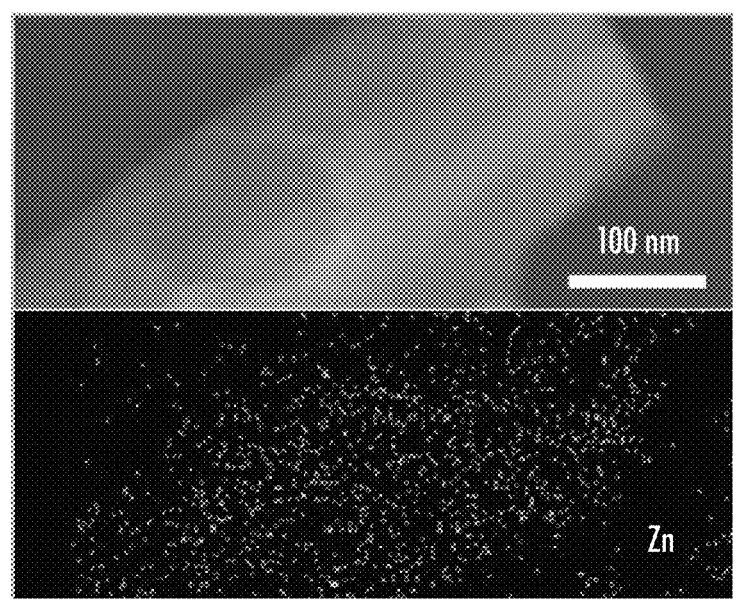
FIG. 7D illustrates microcopy images of an example embodiment according of the disclosure.

The STEM elemental mapping and energy dispersive X-ray spectroscopy (EDS) shown in FIG. 7D further confirm the results of XPS analysis—no Zn in the pristine NaCaVO, uniform and rich distribution of Zn in the discharged state (see FIG. 6D), minimal Zn in the fully charged state, and stable existence of Ca and Na in NaCaVO during Zn (de-)intercalation.

To confirm the stability of Na and Ca in NaCaVO, NaCaVO cathode was separately soaked into a 1M Zn(CF$_3$SO$_3$)$_2$ aqueous solution for various times. The electrolyte solution was noted to be transparent and colorless even after 480 hours. Meanwhile, ICP analysis indicates that the concentrations of Na, Ca and V in the electrolyte solution remains minimal, suggesting no dissolution of NaCaVO into the aqueous Zn(CF$_3$SO$_3$)$_2$. The high stability of Na$^+$ and $Ca^{2+}$ in NaCaVO cathode is also supported by the highly negative formation energy for Ca (−10.08 eV) and Na (A1 site: −5.54 eV and A2 site: −4.27 eV), respectively, obtained from DFT calculations. In addition, the calculations of Gibbs free energy change suggest that $Ca^{2+}$ and $Na^+$ in NaCaVO cannot be replaced by $Zn^{2+}$ in the electrolyte solution. This is also confirmed by the results that the Ca and Na contents in the electrolyte solution after discharge (13.3 ppm and 18.1 ppm) and charge (10.2 ppm and 15.5 ppm) are similar to that in the pristine electrolyte solution (14.4 ppm and 18.8 ppm). Therefore, $Ca^{2+}$ and $Na^+$ alternately suited between $V_3O_8$ layers are stable and act as framework-stabilizing pillars during $Zn^{2+}$-(de)intercalation cycles.

According to previous studies, $H^+$ co-intercalation with $Zn^{2+}$ has been raised as a probability, while the consumption of $H^+$ in the electrolyte results in the formation of $Zn_4SO_4(OH)_6 \cdot 4H_2O$ precipitate on the cathode interface. Following the same mechanism, a Zn-based precipitate would also be observed if $H^+$ was indeed co-intercalated into the NaCaVO in the battery. Two experiments were performed to examine this. First, 10 uL 1 M NaOH was added to 10 mL 3M $Zn(CF_3SO_3)_2$, which formed a white precipitate, suggesting that a higher pH in $Zn(CF_3SO_3)_2$ can lead to precipitation. In the second experiment, thin nanoplates were observed to cover the surface of NaCaVO after discharge. However, no new phase can be confirmed from the ex-situ XRD after discharge, which may imply that the nanoplates may not be the same phase as the precipitate, but perhaps a different phase in amorphous state. Interestingly, these nanoplates disappear when charged to 1.5 V.

Based on the above results, the following electrochemical reactions are proposed for what is happening in the battery during a typical discharge and charge cycle, using 0.1 A g$^{-1}$ as an example and ignoring the possible co-intercalation of $H^+$. A discharge capacity of 347 mAh g$^{-1}$ at 100% coulombic efficiency is obtained at 0.1 A g$^{-1}$, corresponding to an 8.6-mole-electron-transfer process and intercalation of 4.3 mol $Zn^{2+}$ in NaCaVO.

At the cathode

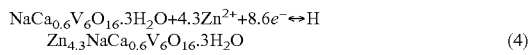

$$NaCa_{0.6}V_6O_{16} \cdot 3H_2O + 4.3Zn^{2+} + 8.6e^- \leftrightarrow Zn_{4.3}NaCa_{0.6}V_6O_{16} \cdot 3H_2O \quad (4)$$

At the anode

$$4.3Zn \leftrightarrow 4.3Zn^{2+} + 8.6e^- \quad (5)$$

Long-Term Stability and Further Understanding

The long-term cycle stability of NaCaVO cathode was evaluated at both low current density (0.3 A g$^{-1}$) and high current density (2 A g$^{-1}$ and 5 A g$^{-1}$). At 0.3 A g$^{-1}$, 85% of the initial capacity (317 mAh g$^{-1}$) can be retained after 300 cycles. Remarkably, FIG. 8A shows an impressive 83% retention of the initial capacity of 151 mAh g$^{-1}$ (or 66% of the highest capacity of 189 mAh g$^{-1}$) at 5 A g$^{-1}$ after 10,000 cycles, demonstrating NaCaVO's excellent long-term cycle stability. FIG. 8B shows that the morphology and microstructure of NaCaVO nanobelts are well preserved even after the long-term cycling test. From the HRTEM analysis shown in FIGS. 1D, 8C and 8D, it is evident that the (100) d-spacing of NaCaVO after $Zn^{2+}$-tintercalation is decreased to $d_{100}$=10.75 Å from 10.85 Å of the pristine CaVO and increased back to 10.84 Å again after $Zn^{2+}$-(de-) intercalation. The corresponding SAED patterns shown in the insets of FIGS. 7C and 7D are like that of the as-prepared NaCaVO shown in FIG. 1D, suggesting that no phase change occurred during $Zn^{2+}$ intercalation and (de-)intercalation.

To further support the above observation, ex-situ XRD was performed on NaCaVO electrode at different SOCs. As shown in FIG. 8E, the characteristic diffraction peak located at 10.90°, which corresponds to the (002) plane, gradually shifts to a higher angle (11.08°) upon being discharged to 0.4 V, and then return to the initial position (10.91°) after being fully charged to 1.5 V. Correspondingly, the gallery spacing of (002) plane, which is also the gallery spacing of $V_3O_8$ layers, decreases during the discharge process and increases again upon charge. The decrease in the gallery spacing during the $Zn^{2+}$-tintercalation can be ascribed to the strong electrostatic attraction between the intercalated $Zn^{2+}$ and $(V_3O_8)^-$ layers. Therefore, during $Zn^{2+}$ (de-)intercalation, the layered structure of NaCaVO is well preserved with a flexible adjustment of the gallery spacing to accommodate the larger $Zn^{2+}$. It is believed that the robustness of this layered structure derives from the co-stabilization of $Na^+$ and $Ca^{2+}$ in the presence of structural water. Overall, it can be concluded that NaCaVO undergoes a reversible expansion-contraction of gallery spacing to accommodate $Zn^{2+}$ (de-)intercalation without phase transformation. The excellent long-term cycling stability of NaCaVO may be attributed to its robust layered structure co-stabilized by $Na^+$ and $Ca^{2+}$ in the presence of structural water. Nonetheless, the observed degradation over the 10,000 cycles may also related to the Zn-dendrite formation, or formation of nano-plates on the cathode interface during discharge.

Referring now to FIGS. 1A to 1D, these figures illustrate example structural and morphological characterization of NaCaVO nanobelts. For example, in (a) Experimental and Rietveld-refined XRD patterns with experimental data in black dots, tick marks directly under and curve at the bottom indicate the allowed Bragg reflections and difference between experiment and refinement, respectively; inset: the crystal structure of NaCaVO viewed along the b-axis; (b) SEM image; (c) TEM image; and (d) HRTEM image (inset: SAED pattern) of the as-prepared NaCaVO nanobelts.

Referring now to FIGS. 2A to 2D, these figures illustrate example electrochemical $Zn^{2+}$-storage performance of NaCaVO cathode in a coin cell-type ZIB: (a) Discharge-charge curves of NaCaVO's initial five cycles at 0.1 A g$^{-1}$; (b) rate performance of NaCaVO and dry-NaCaVO at various current densities; (c) Ragone plot comparing with other reported ZIB cathodes; and (d) long-term cycling performance of NaCaVO at 2 A g$^{-1}$ for 2,000 cycles.

Referring now to FIGS. 3A to 3D, these figures illustrate possible migration pathways for $Zn^{2+}$ in NaCaVO viewed along b axis: (b) bottom-up view and (c) side view along a axis of the red zone in (a); (d) energy barriers along $Zn^{2+}$-migration pathways for NaCaVO with and without structural water.

Figure 4B:
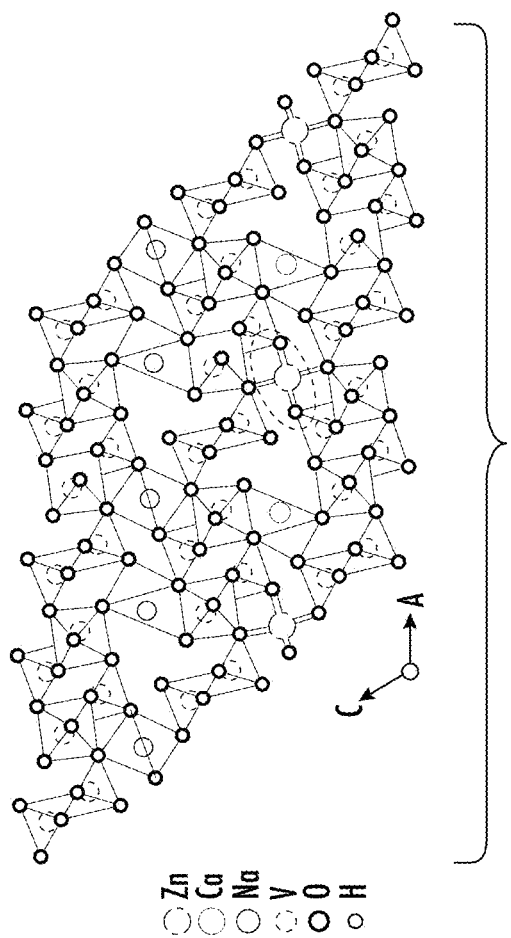
FIGS. 4A and 4B illustrate representations of example embodiments according to the disclosure.
Figure 4A:
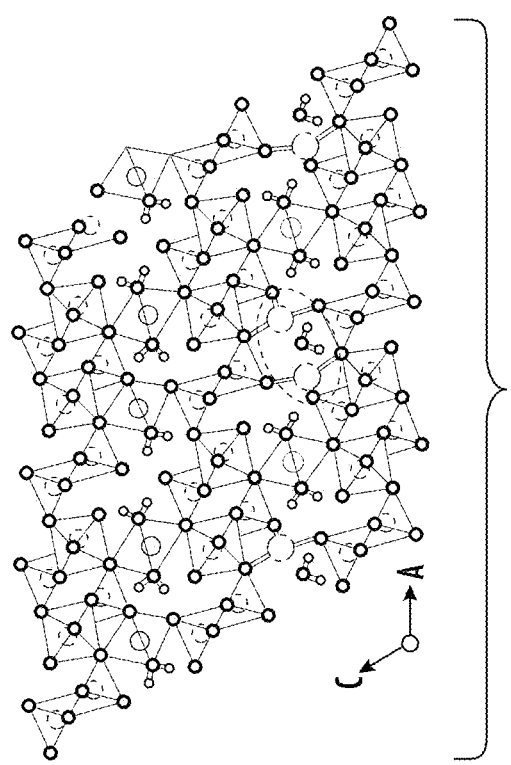

Referring now to FIGS. 4A and 4B, these figures illustrate an example structural comparison between (a) NaCaVO and (b) dry-NaCaVO (NaCaVO with no structural water) after Zn-ions intercalation. Circled regions highlight the change in the number of $Zn^{2+}$ host sites.

Referring now to FIGS. 5A to 5F, these figures illustrate comparison of electrokinetics for an example NaCaVO and dry-NaCaVO cathode characterized by a three-electrode system in 3M $Zn(CF_3SO_3)_2$ aqueous solution: (a) CV curves measured at a scan rate of 0.3 mV s$^{-1}$; (b) plots of log (peak current) vs. log (scan rate); (c) capacity contribution ratio at different scan rates; (d) Nyquist plot (circle/square) and equivalent-circuit fitting (curve) at OCV. Inset: equivalent circuit used in the fitting. $R_s$, ohmic resistance; $R_a$, surface absorption resistance; $R_{CT}$, charge transfer resistance; CPE, constant phase element; $Z_w$, Warburg impedance; (e) plots of Z'(Ω) vs. $\omega^{-0.5}$ in the low-frequency Warburg region; (f) plots of $\ln(R_{CT}^{-1})$ vs. 1000/T.

Figure 6B:
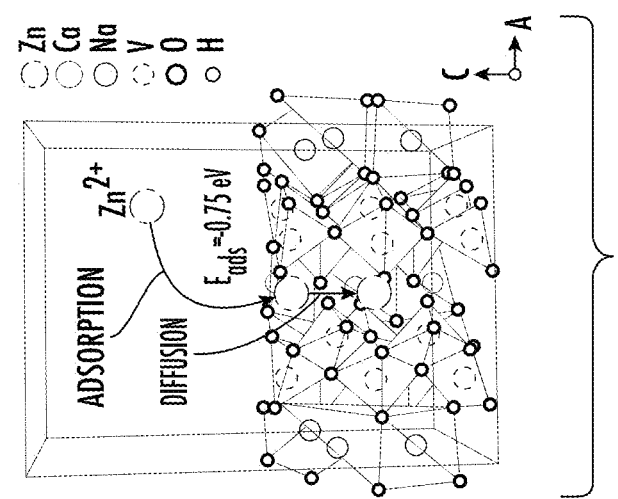
FIGS. 6A and 6B illustrate representations of $Zn^{2+}$ adsorption and diffusion according to example embodiments of the disclosure.
Figure 6A:
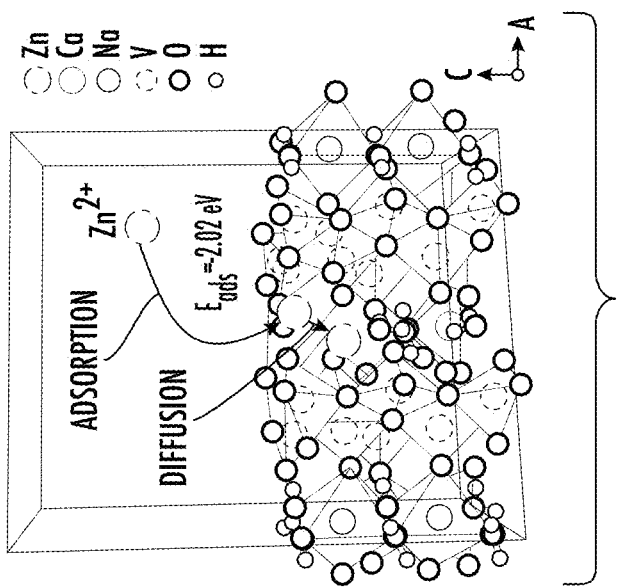

Referring now to FIGS. 6A to 6C, these figures illustrate example $Zn^{2+}$ adsorption and diffusion models from surface to bulk for (a) NaCaVO and (b) dry-NaCaVO (NaCaVO without $H_2O$); (c) $Zn^{2+}$-diffusion energy profiles from the surface to bulk for NaCaVO and NaCaVO without $H_2O$.

Referring now to FIGS. 7A to 7D, these figures illustrate an example compositional analysis of NaCaVO cathode in different states: (a) Zn-2p; (b) V-2p; (c) Na-1s and Ca-2p XPS spectra of the pristine, discharged (D-0.4V) and charged (C-1.5V) samples, respectively; (d) STEM image and Zn mapping of a discharged samples.

Referring now to FIGS. 8A to 8E, these figures illustrate example characterization data for (a) Long-term cycling performance at 5 A $g^{-1}$ for 10,000 cycles. Ex-situ microstructural analysis of NaCaVO nanobelts at different discharge and charge states: (b) TEM images after 10,000 cycles; (c) HRTEM image (inset: SAED) of the NaCaVO at a discharged state (D-0.4 V); (d) HRTEM image (inset: SAED) of the NaCaVO at a fully charged state (C-1.5 V). (e) Ex-situ XRD patterns of (002) Bragg peak of NaCaVO during the first discharge and charge cycle at 0.2 A $g^{-1}$ at different discharge and charge potentials

The invention claimed is:

1. A method of forming a vanadium oxide nanobelt, the method comprising:
   dissolving a vanadium compound, an alkali metal salt, and an alkaline earth metal salt in a solvent to form a solution, the solution having a pH between about 6.00 and about 8.00;
   sealing the solution in a sealable vessel; and
   heating the sealed vessel containing the solution at a temperature for a time period, wherein the vanadium compound has an oxidation state of +3 or +5.

2. The method of claim 1, wherein the vanadium compound includes vanadium chloride and/or ammonium vanadate.

3. The method of claim 1, wherein the alkaline earth metal salt comprises a calcium salt.

4. The method of claim 3, wherein the calcium salt includes calcium nitrate, calcium chloride, or calcium hydroxide.

5. The method of claim 1, wherein the alkali metal salt comprises a sodium salt.

6. The method of claim 5, wherein the sodium salt includes sodium chloride, sodium hydroxide, sodium nitrate, or sodium nitrite.

7. The method of claim 1, wherein the sealable vessel comprises an autoclave.

8. The method of claim 1, wherein the solvent comprises water.

9. The method of claim 1, wherein the pH is between about 6.50 and about 7.50.

10. A composition for a cathode, the composition comprising NaCaVO.

11. The composition of claim 10, wherein the composition includes the empirical formula $NaCa_{0.6}V_6O_{16}$.

12. The composition of claim 11, wherein the composition comprises water, the composition is a hydrate, or both.

13. The composition of claim 12, wherein the hydrate includes between two to 4 water molecules.

14. The composition of claim 10, wherein the NaCaVO has a surface area of about 120 $m^2$ $g^{-1}$ to about 160 $m^2$ $g^{-1}$.

15. A battery comprising:
    a cathode comprising the composition of claim 10 and
    an anode comprising zinc.

16. The battery of claim 15, wherein the battery retains greater than 75% of capacity after about 10,000 charge-discharge cycles relative to the first charge-discharge cycle.

17. The battery of claim 15, wherein the battery displays an energy density of about 240 to about 260 Wh $kg^{-1}$ at about 0.1 A/g.

18. The battery of claim 15 further comprising an electrolyte.

19. The battery of claim 18, wherein the electrolyte comprises $Zn(CF_3SO_3)_2$.

\* \* \* \* \*